United States Patent
Kasada

(10) Patent No.: US 11,367,461 B2
(45) Date of Patent: *Jun. 21, 2022

(54) MAGNETIC RECORDING MEDIUM HAVING CHARACTERIZED MAGNETIC LAYER, AND MAGNETIC RECORDING AND REPRODUCING APPARATUS

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/857,502

(22) Filed: Apr. 24, 2020

(65) Prior Publication Data
US 2020/0342903 A1 Oct. 29, 2020

(30) Foreign Application Priority Data
Apr. 26, 2019 (JP) .............................. JP2019-086681

(51) Int. Cl.
| | | |
|---|---|---|
| *G11B 5/733* | (2006.01) | |
| *G11B 5/735* | (2006.01) | |
| *G11B 5/78* | (2006.01) | |
| *G11B 5/706* | (2006.01) | |
| *G01B 11/30* | (2006.01) | |
| *G01B 9/02* | (2022.01) | |
| *G11B 5/73* | (2006.01) | |
| *G11B 5/702* | (2006.01) | |

(52) U.S. Cl.
CPC ............... *G11B 5/733* (2013.01); *G01B 9/02* (2013.01); *G01B 11/30* (2013.01); *G11B 5/7028* (2013.01); *G11B 5/70605* (2013.01); *G11B 5/70678* (2013.01); *G11B 5/73937* (2019.05); *G11B 5/7356* (2019.05); *G11B 5/78* (2013.01)

(58) Field of Classification Search
None
See application file for complete search history.

(56) References Cited

U.S. PATENT DOCUMENTS

| | | | |
|---|---|---|---|
| 7,011,899 B2 | 3/2006 | Kato | |
| 7,755,863 B2 | 7/2010 | Neumann et al. | |
| 8,535,817 B2* | 9/2013 | Imaoka | G11B 5/70 428/844 |
| 9,311,946 B2 | 4/2016 | Tanaka et al. | |
| 10,410,665 B2 | 9/2019 | Ozawa et al. | |
| 10,679,657 B2* | 6/2020 | Kurokawa | G11B 5/127 |
| 10,741,208 B2* | 8/2020 | Kurokawa | G11B 5/127 |
| 10,811,048 B2 | 10/2020 | Ozawa et al. | |
| 2002/0086183 A1 | 7/2002 | Misawa | |
| 2002/0098280 A1* | 7/2002 | Otsuka | B08B 1/008 427/129 |
| 2002/0164503 A1 | 11/2002 | Tani et al. | |
| 2003/0228489 A1 | 12/2003 | Doushita et al. | |
| 2004/0066725 A1 | 4/2004 | Usui | |
| 2004/0091746 A1 | 5/2004 | Nakamura et al. | |
| 2004/0151946 A1 | 8/2004 | Kato et al. | |
| 2004/0214046 A1 | 10/2004 | Ejiri et al. | |
| 2005/0053804 A1 | 3/2005 | Kato | |
| 2006/0066999 A1 | 3/2006 | Ejiri et al. | |
| 2006/0204812 A1* | 9/2006 | Moriyama | H01M 8/1027 528/86 |
| 2007/0262189 A1 | 11/2007 | Kubota | |
| 2009/0046396 A1 | 2/2009 | Nagata et al. | |
| 2009/0086368 A1 | 4/2009 | Kakuishi et al. | |
| 2011/0274947 A1* | 11/2011 | Ishiguro | G11B 5/7023 428/840.4 |
| 2012/0042899 A1 | 2/2012 | Boday et al. | |
| 2012/0045664 A1* | 2/2012 | Tanaka | G11B 5/70626 428/840.2 |
| 2016/0171993 A1 | 6/2016 | Okubo | |
| 2017/0092315 A1 | 3/2017 | Ozawa et al. | |
| 2017/0186460 A1 | 6/2017 | Kasada et al. | |
| 2017/0221516 A1 | 8/2017 | Oyanagi et al. | |
| 2017/0372740 A1 | 12/2017 | Ozawa et al. | |
| 2018/0147626 A1 | 5/2018 | Shirata et al. | |
| 2018/0286442 A1 | 10/2018 | Ozawa et al. | |

(Continued)

FOREIGN PATENT DOCUMENTS

| | | |
|---|---|---|
| JP | 2002-269711 A | 9/2002 |
| JP | 2003-022520 A | 1/2003 |

(Continued)

OTHER PUBLICATIONS

Notice of Allowance dated Apr. 22, 2020 in U.S. Appl. No. 16/367,918.
Office Action dated Jul. 21, 2020 in U.S. Appl. No. 16/777,418.
Office Action dated Jul. 22, 2020 in U.S. Appl. No. 16/777,368.
Office Action dated Nov. 8, 2019 in U.S. Appl. No. 16/367,918.
U.S. Appl. No. 16/777,418, Pending.
Office Action dated Dec. 15, 2020 in U.S. Appl. No. 16/777,368.
Office Action dated Oct. 27, 2020 in U.S. Appl. No. 16/777,418.
Office Action dated Oct. 27, 2020 in U.S. Appl. No. 16/368,199.
Notice of Allowance dated May 21, 2021 in U.S. Appl. No. 16/777,368.
Notice of Allowance dated Jun. 2, 2021 in U.S. Appl. No. 16/777,418.
U.S. Appl. No. 17/399,241, filed Aug. 11, 2021 (Ozawa).
U.S. Appl. No. 16/857,502 (the present application), Pending.
U.S. Appl. No. 16/777,368, Allowed.

(Continued)

*Primary Examiner* — Kevin M Bernatz
(74) *Attorney, Agent, or Firm* — Sughrue Mion, PLLC

(57) ABSTRACT

The magnetic recording medium includes: a non-magnetic support; and a magnetic layer including ferromagnetic powder, in which a difference $S_{after} - S_{before}$ between a spacing $S_{after}$ measured on a surface of the magnetic layer by optical interferometry after methyl-ethyl-ketone cleaning and a spacing $S_{before}$ measured on the surface of the magnetic layer by optical interferometry before methyl-ethyl-ketone cleaning is more than 0 nm and 15.0 nm or less, and the non-magnetic support is an aromatic polyamide support having a moisture absorption of 2.2% or less.

14 Claims, No Drawings

(56) References Cited

U.S. PATENT DOCUMENTS

| | | | |
|---|---|---|---|
| 2018/0286448 | A1 | 10/2018 | Ozawa et al. |
| 2018/0286451 | A1 | 10/2018 | Ozawa et al. |
| 2019/0027181 | A1 | 1/2019 | Ozawa et al. |
| 2019/0304488 | A1* | 10/2019 | Ozawa ............... G11B 5/00813 |
| 2019/0304497 | A1 | 10/2019 | Kurokawa et al. |
| 2019/0304498 | A1* | 10/2019 | Ozawa ................... G11B 5/127 |
| 2019/0304499 | A1 | 10/2019 | Kurokawa et al. |
| 2020/0090694 | A1 | 3/2020 | Sano et al. |
| 2020/0251136 | A1* | 8/2020 | Ozawa ..................... G11B 5/78 |
| 2020/0251138 | A1* | 8/2020 | Ozawa ..................... G11B 5/70 |
| 2020/0279580 | A1 | 9/2020 | Sano et al. |
| 2020/0302962 | A1 | 9/2020 | Sawayashiki et al. |
| 2020/0312361 | A1* | 10/2020 | Kasada ............. G11B 5/00817 |
| 2020/0342906 | A1* | 10/2020 | Kasada ............. G11B 5/00813 |
| 2020/0365178 | A1* | 11/2020 | Kasada ............. G11B 5/70678 |
| 2020/0365179 | A1* | 11/2020 | Kasada ............. G01B 9/02041 |
| 2021/0012800 | A1 | 1/2021 | Yamaga et al. |
| 2021/0287702 | A1 | 9/2021 | Ozawa et al. |
| 2021/0375311 | A1* | 12/2021 | Ozawa ................. G11B 5/7013 |

FOREIGN PATENT DOCUMENTS

| | | | |
|---|---|---|---|
| JP | 2004-005795 | A | 1/2004 |
| JP | 2004-055137 | A | 2/2004 |
| JP | 2005-85305 | A | 3/2005 |
| JP | 2005-276285 | A | 10/2005 |
| JP | 2006-079691 | A | 3/2006 |
| JP | 2009-087468 | A | 4/2009 |
| JP | 2010-192065 | A | 9/2010 |
| JP | 2010-264683 | A | 11/2010 |
| JP | 2011-84036 | A | 4/2011 |
| JP | 2011-134372 | A | 7/2011 |
| JP | 2012-043495 | A | 3/2012 |
| JP | 2016-110680 | A | 6/2016 |
| JP | 2017-168178 | A | 9/2017 |
| JP | 2018-092693 | A | 6/2018 |
| JP | 2018-170051 | A | 11/2018 |
| JP | 2018-170053 | A | 11/2018 |
| JP | 2018-181396 | A | 11/2018 |

OTHER PUBLICATIONS

Office Action dated Apr. 7, 2021 in U.S. Appl. No. 16/831,158.
Office Action dated Apr. 8, 2021 in U.S. Appl. No. 16/368,199.
Office Action dated Feb. 16, 2021 in U.S. Appl. No. 16/777,418.
Notice of Allowance dated Mar. 31, 2021 in U.S. Appl. No. 16/777,368.
U.S. Appl. No. 16/368,199, Pending.
U.S. Appl. No. 16/367,918, Patented as U.S. Pat. No. 10,741,208.
U.S. Appl. No. 16/874,170, Pending.
U.S. Appl. No. 16/777,368, Pending.
U.S. Appl. No. 16/777,418, Allowed.
U.S. Appl. No. 16/831,158, Pending.
U.S. Appl. No. 16/825,425, Pending.
U.S. Appl. No. 17/329,275, Pending.
U.S. Appl. No. 17/399,241, Pending.
Office Action dated Sep. 13, 2021 in U.S. Appl. No. 16/825,425.
Office Action dated Sep. 27, 2021 in U.S. Appl. No. 16/874,170.
Notice of Allowance dated Oct. 1, 2021 in U.S. Appl. No. 16/777,368.
Office Action dated Jan. 11, 2022 in Japanese Application No. 2019-054337, corresponds to U.S. Appl. No. 16/825,425.
Office Action dated Jan. 11, 2022 in Japanese Application No. 2019-064370, corresponds to U.S. Appl. No. 16/831,158.
Office Action dated Jan. 27, 2022 in U.S. Appl. No. 16/831,158.
Notice of Allowance dated Feb. 3, 2022 in U.S. Appl. No. 16/874,170.
Notice of Allowance dated Feb. 4, 2022 in U.S. Appl. No. 16/825,425.
Notice of Allowance dated Oct. 21, 2021 in U.S. Appl. No. 16/777,418.
Office Action dated Nov. 30, 2021 in U.S. Appl. No. 17/329,275.
Office Action dated Jan. 3, 2022 in U.S. Appl. No. 17/399,241.
Notice of Allowance dated Feb. 11, 2022 in U.S. Appl. No. 16/777,368.
Notice of Allowance dated Feb. 8, 2022 in U.S. Appl. No. 16/777,418.
Notice of Allowance dated Feb. 9, 2022 in U.S. Appl. No. 16/368,199.
Notice of Allowance dated Mar. 14, 2022 in U.S. Appl. No. 17/329,275.
Notice of Allowance dated Apr. 18, 2022 in U.S. Appl. No. 17/399,241.
Notice of Allowance dated Apr. 29, 2022 in U.S. Appl. No. 16/831,158.

* cited by examiner

MAGNETIC RECORDING MEDIUM HAVING CHARACTERIZED MAGNETIC LAYER, AND MAGNETIC RECORDING AND REPRODUCING APPARATUS

CROSS-REFERENCE TO RELATED APPLICATIONS

This application claims priority under 35 U.S.C 119 to Japanese Patent Application No. 2019-086681 filed on Apr. 26, 2019. The above application is hereby expressly incorporated by reference, in its entirety, into the present application.

BACKGROUND OF THE INVENTION

1. Field of the Invention

The present invention relates to a magnetic recording medium and a magnetic recording and reproducing apparatus.

2. Description of the Related Art

A magnetic recording medium (for example, see JP2012-043495A) is a recording medium useful as a data storage medium for storing a large capacity of data (information) for a long period of time.

SUMMARY OF THE INVENTION

A magnetic recording medium used for data storage application may be used in a data center in which a temperature and a humidity are controlled. On the other hand, the data center is required to save power in order to reduce costs. In order to save power, it is desirable that control conditions of the temperature and the humidity in the data center can be more relaxed than a current level or the controlling can be made unnecessary. However, in a case where the control conditions of the temperature and the humidity are relaxed or the controlling is not performed, it is assumed that the magnetic recording medium is exposed to environmental changes caused by weather changes, seasonal changes, and the like, or is stored under various temperature and humidity environments. An example of the environmental changes is a temperature change from a low temperature to a high temperature under a high humidity. An example of the temperature and humidity environments is a high temperature and high humidity environment. Since the magnetic recording medium is always required to exhibit excellent electromagnetic conversion characteristics, it is desirable to provide a magnetic recording medium in which a deterioration of electromagnetic conversion characteristics after such an environmental change and after a storage in such a temperature and humidity environment is suppressed more than in the magnetic recording medium of the related art.

Incidentally, the magnetic recording medium generally has a configuration having a non-magnetic support and a magnetic layer containing ferromagnetic powder. As for the non-magnetic support, for example, a paragraph 0036 of JP2012-043495A discloses various films that can be used as the non-magnetic support.

The present inventor has studied the above-mentioned points and it has been clarified that in a case where a magnetic recording medium including an aromatic polyamide support as a non-magnetic support is stored under a high temperature and high humidity environment after a temperature change from a low temperature to a high temperature occurs under a high humidity, a phenomenon in which electromagnetic conversion characteristics deteriorate occurs.

An object of an aspect of the present invention is to suppress a deterioration of electromagnetic conversion characteristics after a temperature change from a low temperature to a high temperature under a high humidity and further after a storage under a high temperature and high humidity environment in a magnetic recording medium including an aromatic polyamide support.

An aspect of the present invention relates to a magnetic recording medium comprising: a non-magnetic support; and a magnetic layer including ferromagnetic powder, in which a difference ($S_{after}-S_{before}$) (hereinafter, also referred to as a "spacing difference ($S_{after}-S_{before}$) before and after methyl-ethyl-ketone cleaning" or simply a "difference ($S_{after}-S_{before}$)".) between a spacing $S_{after}$ measured on a surface of the magnetic layer by optical interferometry after methyl-ethyl-ketone cleaning and a spacing $S_{before}$ measured on the surface of the magnetic layer by optical interferometry before methyl-ethyl-ketone cleaning is more than 0 nm and 15.0 nm or less, and the non-magnetic support is an aromatic polyamide support having a moisture absorption of 2.2% or less.

In an embodiment, the difference ($S_{after}-S_{before}$) may be 3.0 nm or more and 15.0 nm or less.

In an embodiment, the moisture absorption of the aromatic polyamide support may be 2.0% or less.

In an embodiment, the moisture absorption of the aromatic polyamide support may be 1.0% or more and 2.0% or less.

In an embodiment, the magnetic recording medium may further comprise a non-magnetic layer including non-magnetic powder between the non-magnetic support and the magnetic layer.

In an embodiment, the magnetic recording medium may further comprise a back coating layer including non-magnetic powder on a surface side of the non-magnetic support opposite to a surface side provided with the magnetic layer.

In an embodiment, the magnetic recording medium may be a magnetic tape.

Another aspect of the present invention relates to a magnetic recording and reproducing apparatus comprising: the magnetic recording medium described above; and a magnetic head.

According to an aspect of the present invention, it is possible to provide a magnetic recording medium that includes an aromatic polyamide support and has a small deterioration of electromagnetic conversion characteristics even though being stored under a high temperature and high humidity environment after a temperature change from a low temperature to a high temperature under a high humidity, and a magnetic recording and reproducing apparatus including the magnetic recording medium.

DESCRIPTION OF THE PREFERRED EMBODIMENTS

Magnetic Recording Medium

An aspect of the present invention relates to a magnetic recording medium comprising: a non-magnetic support; and a magnetic layer including ferromagnetic powder, in which a difference $S_{after}-S_{before}$ between a spacing $S_{after}$ measured on a surface of the magnetic layer by optical interferometry after methyl-ethyl-ketone cleaning and a spacing $S_{before}$ measured on the surface of the magnetic layer by optical interferometry before methyl-ethyl-ketone cleaning is more than 0 nm and 15.0 nm or less, and the non-magnetic support is an aromatic polyamide support having a moisture absorption of 2.2% or less.

In the present invention and this specification, "methyl-ethyl-ketone cleaning" means that a sample piece cut out from a magnetic recording medium is immersed in methyl ethyl ketone (200 g) having a liquid temperature of 20° C. to 25° C. and ultrasonically cleaned for 100 seconds (ultrasonic output: 40 kHz). In a case where a magnetic recording medium to be cleaned is a magnetic tape, a sample piece having a length of 5 cm is cut out and subjected to methyl-ethyl-ketone cleaning. A width of the magnetic tape and a width of the sample piece cut out from the magnetic tape are usually ½ inches. 1 inch is 0.0254 meters. For also magnetic tapes other than that having ½ inches width, a sample piece having a length of 5 cm may be cut out and subjected to methyl-ethyl-ketone cleaning. In a case where a magnetic recording medium to be cleaned is a magnetic disk, a sample piece having a size of 5 cm×1.27 cm is cut out and subjected to methyl-ethyl-ketone cleaning. A measurement of a spacing after methyl-ethyl-ketone cleaning, which will be described in detail below, is performed after a sample piece after methyl-ethyl-ketone cleaning is left under an environment of a temperature of 23° C. and a relative humidity of 50% for 24 hours.

In the present invention and this specification, a "magnetic layer surface" of the magnetic recording medium is identical to a surface of the magnetic recording medium on a magnetic layer side.

In the present invention and this specification, a spacing measured on the magnetic layer surface of the magnetic recording medium by optical interferometry is a value measured by the following method.

In a state where the magnetic recording medium (specifically, the above-mentioned sample piece. The same applies hereinafter) and a transparent plate member (for example, a glass plate or the like) are superposed such that the magnetic layer surface of the magnetic recording medium faces the transparent plate member, a pressing member is pressed at a pressure of 0.5 atm (1 atm=101325 Pa (Pascal)) from a side opposite to a side of the magnetic layer of the magnetic recording medium. In this state, the magnetic layer surface of the magnetic recording medium is irradiated with light through the transparent plate member (irradiation region: 150,000 to 200,000 µm²), and a spacing (distance) between the magnetic layer surface of the magnetic recording medium and the magnetic recording medium side surface of the transparent plate member is obtained based on an intensity of interference light (for example, a contrast of an interference fringe image) generated by an optical path difference between reflected light from the magnetic layer surface of the magnetic recording medium and reflected light from the magnetic recording medium side surface of the transparent plate member. Here, emitted light is not particularly limited. In a case where emitted light is light having a light emission wavelength over a relatively wide wavelength range, such as white light having light with a plurality of wavelengths, a member, such as an interference filter, which has a function of selectively cutting light with a specific wavelength or light other than light in a specific wavelength region is disposed between the transparent plate member and a light receiving section that receives reflected light, and light of some wavelengths or light in some wavelength regions in reflected light is selectively incident on the light receiving section. In a case where light to be emitted is light having a single emission peak (so-called monochromatic light), the member may not be used. As an example, a wavelength of light incident on the light receiving section can be in a range of 500 to 700 nm, for example. Here, a wavelength of light incident on the light receiving section is not limited to the above range. Moreover, the transparent plate member may be a member having transparency which allows emitted light to pass therethrough to such an extent that the interference light can be obtained by irradiating a magnetic recording medium with light through this member.

An interference fringe image obtained by the above spacing measurement is divided into 300,000 points to obtain a spacing of each point (a distance between the magnetic layer surface of the magnetic recording medium and the magnetic recording medium side surface of the transparent plate member), and thus this is used as a histogram and a mode value in the histogram is used as a spacing. The difference ($S_{after}-S_{before}$) is a value obtained by subtracting a mode value before methyl-ethyl-ketone cleaning from a mode value after methyl-ethyl-ketone cleaning at the above 300,000 points.

Two sample pieces cut out from the same magnetic recording medium, and the spacing value $S_{before}$ is obtained without methyl-ethyl-ketone cleaning on the one sample piece and the spacing value $S_{after}$ is obtained after subjecting the other sample piece to methyl-ethyl-ketone cleaning. Thereby, the difference ($S_{after}-S_{before}$) may be obtained. Alternatively, the difference ($S_{after}-S_{before}$) may be obtained by obtaining the spacing value after subjecting the sample piece for which the spacing value has been obtained before methyl-ethyl-ketone cleaning to methyl-ethyl-ketone cleaning thereafter.

The above measurement can be performed using, for example, a commercially available tape spacing analyzer (tape spacing analyzer; TSA) such as tape spacing analyzer manufactured by Micro Physics. Spacing measurement in the examples was performed using a tape spacing analyzer manufactured by Micro Physics.

In the present invention and this specification, the "aromatic polyamide" means a polyamide containing an aromatic skeleton, and the "aromatic polyamide support" means a support containing an aromatic polyamide film. The aromatic polyamide support can be a single-layer aromatic polyamide film, or a laminated film of two or more aromatic polyamide films having the same constituent components or a laminated film of two or more aromatic polyamide films having different constituent components. The "aromatic polyamide film" refers to a film in which a component that occupies the largest amount on a mass basis among components constituting the film is an aromatic polyamide. The laminated film may optionally include a bonding layer or the like between two adjacent layers.

In the present invention and this specification, the moisture absorption of the aromatic polyamide support is a value obtained by the following method.

A sample piece (for example, a sample piece having a mass of a few grams) cut out from the aromatic polyamide support of which the moisture absorption is to be measured is dried in a vacuum dryer at a temperature of 180° C. and a pressure of 100 Pa or less until a constant weight is reached. A mass of the dried sample piece is defined as W1. W1 is a value measured in a measurement environment of a temperature of 23° C. and a relative humidity of 50% within 30 seconds after the sample piece is taken out of the vacuum dryer. Next, a mass of this sample piece after being left under an environment of a temperature of 25° C. and a relative humidity of 75% for 48 hours is defined as W2. W2 is a value measured in a measurement environment of a temperature of 23° C. and a relative humidity of 50% within 30 seconds after the sample piece is removed from the environment. The moisture absorption is calculated by the following equation.

Moisture absorption (%)=[($W2-W1$)/$W1$]×100

For example, after removing portions, such as the magnetic layer, other than the aromatic polyamide support from the magnetic recording medium by a well-known method (for example, film removal using an organic solvent), the moisture absorption of the aromatic polyamide support can be obtained by the above method.

Hereinafter, supposition of the present inventor will be made on the fact that the above-mentioned magnetic recording medium is capable of suppressing a deterioration of electromagnetic conversion characteristics after a temperature change from a low temperature to a high temperature under a high humidity and further after a storage under a high temperature and high humidity environment (hereinafter, simply referred to as a "deterioration of electromagnetic conversion characteristics".).

The reproducing of data recorded on the magnetic recording medium is generally performed by causing the magnetic layer surface and a magnetic head (hereinafter, simply referred to as a "head".) to come into contact with each other for sliding.

On the other hand, it is considered that in a case where a temperature change from a low temperature to a high temperature occurs under a high humidity, condensation (adhesion of moisture) occurs on the magnetic layer surface of the magnetic recording medium. An increase in a friction coefficient during sliding between the magnetic layer surface and the magnetic head due to presence of the moisture is supposed to cause a deterioration of electromagnetic conversion characteristics. Therefore, it is considered that in a case where the amount of moisture adhering to the magnetic layer surface can be reduced in a case where a temperature change from a low temperature to a high temperature occurs under a high humidity, an increase in a friction coefficient can be suppressed, and as a result, a deterioration of electromagnetic conversion characteristics can be suppressed.

By the way, a portion (protrusion) that mainly contacts (so-called true contact) the head in a case where the magnetic layer surface and the head slide on each other and a portion positioned lower than the portion (hereinafter, referred to as a "base portion".) are generally present on the magnetic layer surface. It is considered that the spacing described above is a value that serves as an index of a distance between the head and the base portion in a case where the magnetic layer surface and the head slide on each other. Here, it is supposed that in a case where any component is present on the magnetic layer surface, the spacing becomes narrower as the amount of component interposed between the base portion and the head increases. On the other hand, in a case where the component is removed by methyl-ethyl-ketone cleaning, the spacing is widened, so that the value of spacing $S_{after}$ after methyl-ethyl-ketone cleaning becomes larger than the value of spacing $S_{before}$ before methyl-ethyl-ketone cleaning. Therefore, it is considered that the spacing difference ($S_{after}-S$ before) before and after methyl-ethyl-ketone cleaning can be used as an index of the amount of the component interposed between the base portion and the head.

With respect to the above point, the present inventor supposes that the presence of the component removed by methyl-ethyl-ketone cleaning on the magnetic layer surface promotes adhesion of the moisture to the magnetic layer surface in a case where a temperature change from a low temperature to a high temperature occurs under a high humidity. For this reason, it is considered that a decrease in the spacing difference ($S_{after}-S_{before}$) before and after methyl-ethyl-ketone cleaning, that is, a reduction in the amount of the component contributes to suppression of the adhesion of moisture, and as a result, leads to suppression of the increase in the friction coefficient. The present inventor considers that this contributes to suppression of a deterioration of electromagnetic conversion characteristics due to a temperature change from a low temperature to a high temperature under a high humidity. With respect to this, according to the study by the present inventor, there was no correlation between a value of a spacing difference before and after n-hexane cleaning disclosed in JP2012-043495A described above and the value of the spacing difference before and after methyl-ethyl-ketone cleaning are described. It is supposed that this is because the above component cannot be removed or cannot be sufficiently removed by n-hexane cleaning.

Details of the above component are not clear. As only supposition, the present inventor considers that the above component may be a component having a higher molecular weight than that of an organic compound normally added as an additive to the magnetic layer. For an aspect of this component, the present inventor supposes as follows. In an aspect, the magnetic layer is formed by applying a magnetic layer forming composition including a curing agent on the non-magnetic support directly or through another layer, in addition to ferromagnetic powder and a binding agent, and performing a curing treatment. By the curing treatment here, the binding agent and the curing agent can be subjected to a curing reaction (crosslinking reaction). Here, it is considered that a binding agent which is not cured with a curing agent or a binding agent which is insufficiently cured with a curing agent is easily released from the magnetic layer and may also be present on the magnetic layer surface. The present inventor supposes that the fact that such a binding agent (for example, a functional group of this binding agent) easily adsorbs moisture may cause a promotion of adhesion of the moisture to the magnetic layer surface in a case where a temperature change from a low temperature to a high temperature occurs under a high humidity.

In addition, it is considered that in a case where the non-magnetic support absorbs a large amount of moisture during a storage under a high temperature and high humidity environment, a friction coefficient during contact of the magnetic layer surface of the magnetic recording medium including the non-magnetic support with the magnetic head is increased. It is considered that this causes a deterioration of electromagnetic conversion characteristics after a temperature change from a low temperature to a high temperature under a high humidity and further after a storage under a high temperature and high humidity environment. It is supposed that since the aromatic polyamide support generally tends to absorb moisture, such an increase in the friction coefficient is likely to occur. On the other hand, in the magnetic recording medium, it is considered that since the aromatic polyamide support has a moisture absorption of 2.2% or less, the amount of moisture absorbed by the aromatic polyamide support during a storage under a high temperature and high humidity environment is small. It is supposed that this also contributes to suppression of a deterioration of electromagnetic conversion characteristics.

However, the above description is supposition and does not limit the present invention in any way. Hereinafter, the magnetic recording medium will be described later in more detail.

Non-Magnetic Support

The magnetic recording medium includes, as a non-magnetic support, an aromatic polyamide support having a moisture absorption of 2.2% or less. From a viewpoint of suppressing a deterioration of electromagnetic conversion characteristics, the moisture absorption of the aromatic polyamide support is 2.2% or less, preferably 2.1% or less, more preferably 2.0% or less, still more preferably 1.9% or less, still more preferably 1.8% or less, still more preferably 1.7% or less, still more preferably 1.6% or less, and still more preferably 1.5% or less. The moisture absorption of the aromatic polyamide support may be, for example, 0% or more, more than 0%, 0.1% or more, 0.3% or more, 0.5% or more, 0.7% or more, 1.0% or more, or 1.2% or more. From a viewpoint of suppressing a deterioration of electromagnetic conversion characteristics, since the aromatic polyamide support preferably has a low moisture absorption, the moisture absorption may be 0%. Moreover, from a viewpoint of suppressing a deformation of the magnetic recording medium after a long-term storage, it is preferable that the aromatic polyamide support having the low moisture absorption is used as the non-magnetic support of the magnetic recording medium. For example, from a viewpoint of suppressing a deformation of the magnetic tape in a tape width direction after a long-term storage, it is preferable that a tape-shaped magnetic recording medium (magnetic tape) includes the aromatic polyamide support having the low moisture absorption. In the magnetic tape, the aromatic polyamide support preferably has a Young's modulus of 3000 N/mm$^2$ or more in a longitudinal direction and 4000 N mm$^2$ or more in a width direction. From a viewpoint of high capacity of the magnetic recording medium, a surface roughness of one or both surfaces of the aromatic polyamide support is preferably 10 nm or less as a center-line average roughness Ra.

An aromatic ring contained in the aromatic skeleton of the aromatic polyamide is not particularly limited, and specific examples of the aromatic ring include a benzene ring, a naphthalene ring, and the like. The moisture absorption of the aromatic polyamide support can be controlled by a type and a proportion of a constitutional unit constituting the aromatic polyamide. For details of the aromatic polyamide support that can be used as the non-magnetic support of the magnetic recording medium, the well-known technology can be referred to, for example, descriptions disclosed in paragraphs 0007 to 0054 of JP1997-176306A (JP-H09-176306A) and examples of the same publication can be referred to. The non-magnetic support may be a biaxially stretched film, and may be a film that has been subjected to corona discharge, a plasma treatment, an easy-bonding treatment, a heat treatment, or the like.

Magnetic Layer

Spacing Difference before and after Methyl-Ethyl-Ketone Cleaning ($S_{after}-S_{before}$)

The spacing difference ($S_{after}-S_{before}$) before and after methyl-ethyl-ketone cleaning measured by optical interferometry on the magnetic layer surface of the magnetic recording medium is more than 0 nm and 15.0 nm or less. A point that the spacing difference ($S_{after}-S_{before}$) is 15.0 nm or less can contribute to suppression of a deterioration of electromagnetic conversion characteristics of the magnetic recording medium. From this point, the difference ($S_{after}-S_{before}$) is 15.0 nm or less, preferably 14.0 nm or less, more preferably 13.0 nm or less, still more preferably 12.0 nm or less, still more preferably 11.0 nm or less, and still more preferably 10.0 nm or less. As will be described in detail later, the difference ($S_{after}-S_{before}$) can be controlled by a surface treatment of the magnetic layer in a manufacturing process of the magnetic recording medium.

It is supposed that in a case where the surface treatment of the magnetic layer is performed so that the spacing difference ($S_{after}-S_{before}$) before and after methyl-ethyl-ketone cleaning becomes 0 nm, a large amount of components (for example, a lubricant) contributing to improvement of running stability are removed from the magnetic recording medium, and electromagnetic conversion characteristics deteriorate. However, this is supposition and does not limit the present invention in any way. From a viewpoint of suppressing a deterioration of electromagnetic conversion characteristics, the spacing difference ($S_{after}-S_{before}$) of the magnetic recording medium is more than 0 nm, preferably 1.0 nm or more, more preferably 2.0 nm or more, still more preferably 3.0 nm or more, and still more preferably 4.0 nm or more.

Ferromagnetic Powder

As the ferromagnetic powder included in the magnetic layer, one or a combination of two or more well-known ferromagnetic powders that are ferromagnetic powder used in the magnetic layer of various magnetic recording media, may be used. It is preferable to use ferromagnetic powder having a small average particle size, from a viewpoint of improvement of recording density. In this respect, an average particle size of the ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from a viewpoint of magnetization stability, an average particle size of the ferromagnetic powder is preferably 5 nm or more, more preferably 8 nm or more, still more preferably 10 nm or more, still more preferably 15 nm or more, and still more preferably 20 nm or more.

Hexagonal Ferrite Powder

Preferable specific examples of ferromagnetic powder may include hexagonal ferrite powder. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the present invention and this specification, "hexagonal ferrite powder" refers to ferromagnetic powder in which a hexagonal ferrite type crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite type crystal structure in an X-ray diffraction spectrum obtained by X-ray diffraction analysis, it is determined that the hexagonal ferrite type crystal structure is detected as the main phase. In a case where only a single structure is detected by X-ray diffraction analysis, this detected structure is taken as the main phase. The hexagonal ferrite type crystal structure includes at least an iron atom, a divalent metal atom and an oxygen atom, as a constituent atom. The divalent metal atom is a metal atom that can be a divalent cation as an ion, and examples thereof may include an alkaline earth metal atom such as a strontium atom, a barium atom, and a calcium atom, a lead atom, and the like. In the present invention and this specification, the hexagonal strontium ferrite powder means that the main divalent metal atom included in the powder is a strontium atom. In addition, the hexagonal barium ferrite powder means that the main divalent metal atom included in this powder is a barium atom. The main divalent metal atom refers to a divalent metal atom that accounts for the most on an at % basis among divalent metal atoms included in the powder. Here, a rare earth atom is not included in the above divalent metal atom. The "rare earth atom" in the present invention and this specification is selected from the group consisting of a scandium atom (Sc), a yttrium atom (Y), and a lanthanoid atom. The Lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is an aspect of the hexagonal ferrite powder will be described in more detail.

An activation volume of the hexagonal strontium ferrite powder is preferably in a range of 800 to 1600 nm$^3$. The particulate hexagonal strontium ferrite powder exhibiting an activation volume in the above range is suitable for manufacturing a magnetic recording medium exhibiting excellent electromagnetic conversion characteristics. An activation volume of the hexagonal strontium ferrite powder is preferably 800 nm$^3$ or more, and may be, for example, 850 nm$^3$ or more. Further, from a viewpoint of further improving electromagnetic conversion characteristics, an activation volume of the hexagonal strontium ferrite powder is more preferably 1500 nm$^3$ or less, still more preferably 1400 nm$^3$ or less, still more preferably 1300 nm$^3$ or less, still more preferably 1200 nm$^3$ or less, and still more preferably 1100 nm$^3$ or less. The same applies to an activation volume of the hexagonal barium ferrite powder.

The "activation volume" is a unit of magnetization reversal and is an index indicating a magnetic size of a particle. An activation volume described in the present invention and this specification and an anisotropy constant Ku which will be described later are values obtained from the following relational expression between a coercivity Hc and an activation volume V, by performing measurement in an Hc measurement portion at a magnetic field sweep rate of 3 minutes and 30 minutes using a vibrating sample magnetometer (measurement temperature: 23° C.±1° C.). In a unit of the anisotropy constant Ku, 1 erg/cc=1.0×10$^{-1}$ J/m$^3$.

$$Hc=2Ku/Ms\{1-[(kT/KuV)\ln(At/0.693)]^{1/2}\}$$

[In the above formula, Ku: anisotropy constant (unit: J/m$^3$), Ms: saturation magnetization (Unit: kA/m), k: Boltzmann constant, T: absolute temperature (unit: K), V: activation volume (unit: cm$^3$), A: spin precession frequency (unit: s$^{-1}$), t: magnetic field reversal time (unit: s)]

An index for reducing thermal fluctuation, in other words, improving thermal stability may include an anisotropy constant Ku. The hexagonal strontium ferrite powder may preferably have Ku of 1.8×10$^5$ J/m$^3$ or more, and more preferably have a Ku of 2.0×10$^5$ J/m$^3$ or more. Ku of the hexagonal strontium ferrite powder may be, for example, 2.5×10$^5$ J/m$^3$ or less. Here, it means that the higher Ku is, the higher thermal stability is, this is preferable, and thus, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In an aspect, the hexagonal strontium ferrite powder including a rare earth atom may have a rare earth atom surface layer portion uneven distribution property. In the present invention and this specification, the "rare earth atom surface layer portion uneven distribution property" means that a rare earth atom content with respect to 100 at % of an iron atom in a solution obtained by partially dissolving hexagonal strontium ferrite powder with an acid (hereinafter, referred to as a "rare earth atom surface layer portion content" or simply a "surface layer portion content" for a rare earth atom) and a rare earth atom content with respect to 100 at % of an iron atom in a solution obtained by totally dissolving hexagonal strontium ferrite powder with an acid (hereinafter, referred to as a "rare earth atom bulk content" or simply a "bulk content" for a rare earth atom) satisfy a ratio of a rare earth atom surface layer portion content/a rare earth atom bulk content >1.0. A rare earth atom content in hexagonal strontium ferrite powder which will be described later is the same meaning as the rare earth atom bulk content. On the other hand, partial dissolution using an acid dissolves a surface layer portion of a particle configuring hexagonal strontium ferrite powder, and thus, a rare earth atom content in a solution obtained by partial dissolution is a rare earth atom content in a surface layer portion of a particle configuring hexagonal strontium ferrite powder. A rare earth atom surface layer portion content satisfying a ratio of "rare earth atom surface layer portion content/rare earth atom bulk content >1.0" means that in a particle of hexagonal strontium ferrite powder, rare earth atoms are unevenly distributed in a surface layer portion (that is, more than an inside). The surface layer portion in the present invention and this specification means a partial region from a surface of a particle configuring hexagonal strontium ferrite powder toward an inside.

In a case where hexagonal strontium ferrite powder includes a rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle configuring hexagonal strontium ferrite powder contribute to suppression of a decrease in reproducing output in repeated reproduction. It is supposed that this is because hexagonal strontium ferrite powder includes a rare earth atom with a bulk content in the above range, and rare earth atoms are unevenly distributed in a surface layer portion of a particle configuring hexagonal strontium ferrite powder, and thus it is possible to increase an anisotropy constant Ku. The higher a value of an anisotropy constant Ku is, the more a phenomenon called so-called thermal fluctuation can be suppressed (in other words, thermal stability can be improved). By suppressing occurrence of thermal fluctuation, it is possible to suppress a decrease in reproducing output during repeated reproduction. It is supposed that uneven distribution of rare earth atoms in a particulate surface layer portion of hexagonal strontium ferrite powder contributes to stabilization of spins of iron (Fe) sites in a crystal lattice of a surface layer portion, and thus, an anisotropy constant Ku may be increased.

Moreover, it is supposed that the use of hexagonal strontium ferrite powder having a rare earth atom surface layer portion uneven distribution property as a ferromagnetic powder in the magnetic layer also contributes to inhibition of a magnetic layer surface from being scraped by being slid with respect to the magnetic head. That is, it is supposed that hexagonal strontium ferrite powder having rare earth atom surface layer portion uneven distribution property can also contribute to improvement of running durability of the magnetic recording medium. It is supposed that this may be because uneven distribution of rare earth atoms on a surface of a particle configuring hexagonal strontium ferrite powder contributes to improvement of interaction between the particle surface and an organic substance (for example, a binding agent and/or an additive) included in the magnetic layer, and, as a result, a strength of the magnetic layer is improved.

From a viewpoint of further suppressing a decrease in reproducing output during repeated reproduction and/or a viewpoint of further improving the running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving hexagonal strontium ferrite powder. In the present invention and this specification, unless otherwise noted, the content of an atom means a bulk content obtained by totally dissolving hexagonal strontium ferrite powder. The hexagonal strontium ferrite powder including a rare earth atom may include only one kind of rare earth atom as the rare earth atom, or may include two or more kinds of rare earth atoms. The bulk content in the case of including two or more types of rare earth atoms is obtained for the total of two or more types of rare earth atoms. This also applies to other components in the present invention and this specification. That is, unless otherwise noted, a certain component may be used alone or in combination of two or more. A content amount or content in a case where two or more components are used refers to that for the total of two or more components.

In a case where the hexagonal strontium ferrite powder includes a rare earth atom, the included rare earth atom may be any one or more of rare earth atoms. As a rare earth atom that is preferable from a viewpoint of further suppressing a decrease in reproducing output in repeated reproduction, there are a neodymium atom, a samarium atom, a yttrium atom, and a dysprosium atom, among them, the neodymium atom, the samarium atom, and the yttrium atom are more preferable, and the neodymium atom is still more preferable.

In the hexagonal strontium ferrite powder having a rare earth atom surface layer portion uneven distribution property, the rare earth atoms may be unevenly distributed in the surface layer portion of a particle configuring the hexagonal strontium ferrite powder, and the degree of uneven distribution is not limited. For example, for a hexagonal strontium ferrite powder having a rare earth atom surface layer portion uneven distribution property, a ratio between a surface layer portion content of a rare earth atom obtained by partial dissolution under dissolution conditions which will be described later and a bulk content of a rare earth atom obtained by total dissolution under dissolution conditions which will be described later, that is, "surface layer portion content/bulk content" exceeds 1.0 and may be 1.5 or more. A "surface layer portion content/bulk content" larger than 1.0 means that in a particle configuring the hexagonal strontium ferrite powder, rare earth atoms are unevenly distributed in the surface layer portion (that is, more than in the inside). Further, a ratio between a surface layer portion content of a rare earth atom obtained by partial dissolution under dissolution conditions which will be described later and a bulk content of a rare earth atom obtained by total dissolution under the dissolution conditions which will be described later, that is, "surface layer portion content/bulk content" may be, for example, 10.0 or less, 9.0 or less, 8.0 or less, 7.0 or less, 6.0 or less, 5.0 or less, or 4.0 or less. Here, in the hexagonal strontium ferrite powder having a rare earth atom surface layer portion uneven distribution property, the rare earth atoms may be unevenly distributed in the surface layer portion of a particle configuring the hexagonal strontium ferrite powder, and the "surface layer portion content/bulk content" is not limited to the illustrated upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic recording medium, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-091747A, for example.

The partial dissolution means that dissolution is performed such that, at the end of dissolution, the residue of the hexagonal strontium ferrite powder can be visually confirmed in the solution. For example, by partial dissolution, it is possible to dissolve a region of 10 to 20 mass % of the particle configuring the hexagonal strontium ferrite powder with the total particle being 100 mass %. On the other hand, the total dissolution means that dissolution is performed such that, at the end of dissolution, the residue of the hexagonal strontium ferrite powder cannot be visually confirmed in the solution.

The partial dissolution and measurement of the surface layer portion content are performed by the following method, for example. Here, the following dissolution conditions such as an amount of sample powder are illustrative, and dissolution conditions for partial dissolution and total dissolution can be employed in any manner.

A container (for example, a beaker) containing 12 mg of sample powder and 10 mL of 1 mol/L hydrochloric acid is held on a hot plate at a set temperature of 70° C. for 1 hour. The obtained solution is filtered by a membrane filter of 0.1 μm. Elemental analysis of the filtrated solution is performed by an inductively coupled plasma (ICP) analyzer. In this way, the surface layer portion content of a rare earth atom with respect to 100 at % of an iron atom can be obtained. In a case where a plurality of types of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of sample powder and 10 mL of 4 mol/L hydrochloric acid is held on a hot plate at a set temperature of 80° C. for 3 hours. Thereafter, the method is carried out in the same manner as the partial dissolution and the measurement of the surface layer portion content, and the bulk content with respect to 100 at % of an iron atom can be obtained.

From a viewpoint of increasing the reproducing output in a case of reproducing data recorded on the magnetic recording medium, it is desirable that mass magnetization σs of the ferromagnetic powder included in the magnetic recording medium is high. In this regard, the hexagonal strontium ferrite powder including a rare earth atom but not having the rare earth atom surface layer portion uneven distribution property tends to have σs largely lower than the hexagonal strontium ferrite powder including no rare earth atom. On the other hand, it is considered that hexagonal strontium ferrite powder having a rare earth atom surface layer portion uneven distribution property is preferable in suppressing such a large decrease in σs. In an aspect, σs of the hexagonal strontium ferrite powder may be 45 A·m$^2$/kg or more, and may be 47 A·m$^2$/kg or more. On the other hand, from a viewpoint of noise reduction, σs is preferably 80 A·m$^2$/kg or less and more preferably 60 A·m$^2$/kg or less. σs can be measured using a well-known measuring device, such as a vibrating sample magnetometer, capable of measuring magnetic properties. In the present invention and this specification, unless otherwise noted, the mass magnetization σs is a value measured at a magnetic field intensity of 15 kOe. 1 kOe=(10$^6$/4 π) A/m.

Regarding the content (bulk content) of a constituent atom of the hexagonal strontium ferrite powder, a strontium atom content may be, for example, in a range of 2.0 to 15.0 at % with respect to 100 at % of an iron atom. In an aspect, in the hexagonal strontium ferrite powder, a divalent metal atom included in the powder may be only a strontium atom. In another aspect, the hexagonal strontium ferrite powder may include one or more other divalent metal atoms in addition to a strontium atom. For example, a barium atom and/or a calcium atom may be included. In a case where another divalent metal atom other than a strontium atom is included, a barium atom content and a calcium atom content in the hexagonal strontium ferrite powder are, for example, in a range of 0.05 to 5.0 at % with respect to 100 at % of an iron atom, respectively.

As a crystal structure of hexagonal ferrite, a magnetoplumbite type (also called an "M-type"), a W-type, a Y-type, and a Z-type are known. The hexagonal strontium ferrite powder may have any crystal structure. The crystal structure can be confirmed by X-ray diffraction analysis. In the hexagonal strontium ferrite powder, a single crystal structure or two or more crystal structures may be detected by X-ray diffraction analysis. For example, according to an aspect, in the hexagonal strontium ferrite powder, only the M-type crystal structure may be detected by X-ray diffraction analysis. For example, M-type hexagonal ferrite is represented by a composition formula of $AFe_{12}O_{19}$. Here, A represents a divalent metal atom, and in a case where the hexagonal strontium ferrite powder is the M-type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom can be, for example, 0.5 to 10.0 at % with respect to 100 at % of an iron atom. From a viewpoint of further suppressing a decrease in reproducing output in repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in an aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving hexagonal strontium ferrite powder into a value expressed in at % using an atomic weight of each atom. Further, in the present invention and this specification, "not include" for a certain atom means that a content measured by an ICP analyzer after total dissolution is 0 mass %. A detection limit of the ICP analyzer is usually 0.01 parts per million (ppm) or less on a mass basis. The "not included" is used as a meaning including that an atom is included in an amount less than the detection limit of the ICP analyzer. In an aspect, the hexagonal strontium ferrite powder may not include a bismuth atom (Bi).

Metal Powder

Preferable specific examples of the ferromagnetic powder include ferromagnetic metal powder. For details of the ferromagnetic metal powder, descriptions disclosed in paragraphs 0137 to 0141 of JP2011-216149A and paragraphs 0009 to 0023 of JP2005-251351A can be referred to.

ε-Iron Oxide Powder

Preferable specific examples of the ferromagnetic powder include ε-iron oxide powder. In the present invention and this specification, "ε-iron oxide powder" refers to ferromagnetic powder in which a ε-iron oxide type crystal structure is detected as a main phase by X-ray diffraction analysis. For example, in a case where the highest intensity diffraction peak is attributed to a ε-iron oxide type crystal structure in an X-ray diffraction spectrum obtained by X-ray diffraction analysis, it is determined that the ε-iron oxide type crystal structure is detected as the main phase. As a manufacturing method of the ε-iron oxide powder, a manufacturing method from a goethite, a reverse micelle method, and the like are known. All of the manufacturing methods are well known. Regarding a method of manufacturing ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. 51, pp. 5280 to 5284, J. Mater. Chem. C, 2013, 1, pp. 5200 to 5206 can be referred to, for example. Here, the manufacturing method of ε-iron oxide powder capable of being used as the ferromagnetic powder in the magnetic layer of the magnetic recording medium is not limited to the methods described here.

An activation volume of the ε-iron oxide powder is preferably in a range of 300 to 1,500 nm$^3$. The particulate ε-iron oxide powder exhibiting an activation volume in the above range is suitable for manufacturing a magnetic recording medium exhibiting excellent electromagnetic conversion characteristics. An activation volume of the ε-iron oxide powder is preferably 300 nm$^3$ or more, and may be, for example, 500 nm$^3$ or more. Further, from a viewpoint of further improving electromagnetic conversion characteristics, an activation volume of the ε-iron oxide powder is more preferably 1,400 nm$^3$ or less, still more preferably 1,300 nm$^3$ or less, still more preferably 1,200 nm$^3$ or less, and still more preferably 1,100 nm$^3$ or less.

An index for reducing thermal fluctuation, in other words, improving thermal stability may include an anisotropy constant Ku. The ε-iron oxide powder preferably has Ku of $3.0 \times 10^4$ J/m$^3$ or more, and more preferably has Ku of $8.0 \times 10^4$ J/m$^3$ or more. Ku of the ε-iron oxide powder may be, for example, $3.0 \times 10^5$ J/m$^3$ or less. Here, it means that the higher Ku is, the higher thermal stability is, this is preferable, and thus, a value thereof is not limited to the values exemplified above.

From a viewpoint of increasing the reproducing output in a case of reproducing data recorded on the magnetic recording medium, it is desirable that mass magnetization σs of the ferromagnetic powder included in the magnetic recording medium is high. In this regard, in an aspect, σs of the ε-iron oxide powder may be 8 A·m²/kg or more, and may be 12 A·m²/kg or more. On the other hand, from a viewpoint of noise reduction, σs of the ε-iron oxide powder is preferably 40 A·m²/kg or less and more preferably 35 A·m²/kg or less.

In the present invention and this specification, unless otherwise noted, an average particle size of various powders such as the ferromagnetic powder is a value measured by the following method using a transmission electron microscope.

The powder is imaged at a magnification ratio of 100,000 with a transmission electron microscope, and the image is printed on printing paper or is displayed on a display so that the total magnification ratio becomes 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic average of the particle sizes of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and this specification, the powder means an aggregate of a plurality of particles. For example, ferromagnetic powder means an aggregate of a plurality of ferromagnetic particles. Further, the aggregate of the plurality of particles not only includes an aspect in which particles configuring the aggregate directly come into contact with each other, but also includes an aspect in which a binding agent or an additive which will be described later is interposed between the particles. The term "particle" is used to describe a powder in some cases.

As a method of taking sample powder from the magnetic recording medium in order to measure the particle size, a method disclosed in a paragraph 0015 of JP2011-048878A can be used, for example.

In the present invention and this specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of each of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

A content (filling percentage) of the ferromagnetic powder of the magnetic layer is preferably in a range of 50 to 90 mass % and more preferably in a range of 60 to 90 mass %. A high filling percentage of the ferromagnetic powder in the magnetic layer is preferable from a viewpoint of improvement of recording density.

Binding Agent and Curing Agent

The magnetic recording medium may be a coating type magnetic recording medium and may include a binding agent in the magnetic layer. The binding agent is one or more kinds of resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, methyl methacrylate, or the like, a cellulose resin such as nitrocellulose, an epoxy resin, a phenoxy resin, and a polyvinylalkylal resin such as polyvinyl acetal or polyvinyl butyral can be used alone or a plurality of the resins can be mixed with each other to be used. Among them, a polyurethane resin, an acrylic resin, a cellulose resin, and a vinyl chloride resin are preferable. These resins may be homopolymers or copolymers. These resins can be used as the binding agent even in a non-magnetic layer and/or a back coating layer which will be described later.

For the binding agent described above, descriptions disclosed in paragraphs 0028 to 0031 of JP2010-024113A can be referred to. An average molecular weight of the resin used as the binding agent may be, for example, 10,000 or more and 200,000 or less as a weight-average molecular weight. The weight-average molecular weight in the present invention and this specification is, by gel permeation chromatography (GPC), a value obtained by performing polystyrene conversion of a value measured under the following measurement conditions. The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mm ID (inner diameter)×30.0 cm)

Eluent: Tetrahydrofuran (THF)

In an aspect, as a binding agent, a binding agent containing an active hydrogen-containing group can be used. The "active hydrogen-containing group" in the present invention and this specification refers to a functional group that can form a crosslinked structure in a case where this group is cured with a curable functional group and a hydrogen atom contained in this group is released. As the active hydrogen-containing group, a hydroxy group, an amino group (preferably a primary amino group or a secondary amino group), a mercapto group, a carboxy group, and the like can be used, among them, the hydroxy group, the amino group, and the mercapto group are preferable, and the hydroxy group is more preferable. In the binding agent containing the active hydrogen-containing group, a concentration of the active hydrogen-containing group is preferably in a range of 0.10 meq/g to 2.00 meq/g. Also, eq is an equivalent and is a unit that cannot be converted into an SI unit. Further, the concentration of the active hydrogen-containing group may also be expressed by a unit "mgKOH/g". In an aspect, in a resin containing the active hydrogen-containing group, the concentration of the active hydrogen-containing group is preferably in a range of 1 to 20 mgKOH/g.

In an aspect, as a binding agent, a binding agent containing an acidic group can be used. The "acidic group" in the present invention and this specification is used in a meaning including a form of a group capable of releasing $H^+$ in water or a solvent including water (aqueous solvent) to be dissociated into an anion and a salt thereof. As a specific example of an acidic group, a form of each of a sulfonic acid group ($-SO_3H$), a sulfuric acid group ($-OSO_3H$), a carboxy group, a phosphoric acid group, and a salt thereof, can be used, for example. For example, a form of a salt of a sulfonic acid group ($-SO_3H$) means a group represented by $-SO_3M$, where M represents a group representing an atom (for example, an alkali metal atom or the like) which can be a cation in water or an aqueous solvent. The same applies to the form of each of salts of the various groups described above. As an example of the binding agent containing an acidic group, a resin containing at least one type of acidic group selected from the group consisting of a sulfonic acid group and a salt thereof (for example, a polyurethane resin, a vinyl chloride resin, or the like) can be used, for example. Here, the resin included in the magnetic layer is not limited to these resins. In the binding agent containing an acidic group, an acidic group content may be, for example, in a range of 0.03 to 0.50 meq/g. Contents of various functional groups such as an acidic group included in the resin can be obtained by a well-known method according to the kind of functional group. The binding agent can be used in a magnetic layer forming composition in an amount of, for example, 1.0 to 30.0 parts by mass with respect to 100.0 parts by mass of the ferromagnetic powder.

In addition, a curing agent can also be used together with the resin which can be used as the binding agent. As the curing agent, in an aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent can be included in the magnetic layer in a state of being reacted (crosslinked) with other components such as the binding agent, by progressing the curing reaction in a magnetic layer forming process. The same applies to the layer formed using this composition in a case where the composition used to form the other layer includes the curing agent. The preferred curing agent is a thermosetting compound, and polyisocyanate is suitable for this. For details of the polyisocyanate, descriptions disclosed in paragraphs 0124 and 0125 of JP2011-216149A can be referred to. The curing agent can be used in the magnetic layer forming composition in an amount of, for example, 0 to 80.0 parts by mass, and preferably 50.0 to 80.0 parts by mass, from a viewpoint of improvement of a strength of the magnetic layer, with respect to 100.0 parts by mass of the binding agent.

Additive

The magnetic layer may include one or more kinds of additives, as necessary. As the additive, the curing agent described above is used as an example. In addition, examples of the additive included in the magnetic layer include non-magnetic powder (for example, inorganic powder or carbon black), a lubricant, a dispersing agent, a dispersing assistant, an antibacterial agent, an antistatic agent, and an antioxidant.

For example, examples of the lubricant include a fatty acid, a fatty acid ester, and a fatty acid amide, and the magnetic layer can be formed using one or more selected from the group consisting of a fatty acid, a fatty acid ester, and a fatty acid amide.

As a fatty acid, for example, lauric acid, myristic acid, palmitic acid, stearic acid, oleic acid, linoleic acid, linolenic acid, behenic acid, erucic acid, elaidic acid, and the like can be used, among them, stearic acid, myristic acid, and palmitic acid are preferable, and stearic acid is more preferable. The fatty acid may be contained in the magnetic layer in a form of a salt such as a metal salt.

As a fatty acid ester, for example, esters such as lauric acid, myristic acid, palmitic acid, stearic acid, oleic acid, linoleic acid, linolenic acid, behenic acid, erucic acid, and elaidic acid can be used. Specific examples thereof can include, for example, butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, butoxyethyl stearate, and the like.

As a fatty acid amide, the amides of various fatty acids described above, such as lauric acid amide, myristic acid amide, palmitic acid amide, and stearic acid amide can be used.

A content of a fatty acid in the magnetic layer forming composition is, for example, 0 to 10.0 parts by mass, preferably 0.1 to 10.0 parts by mass, and more preferably 1.0 to 7.0 parts by mass per 100.0 parts by mass of the ferromagnetic powder. A content of a fatty acid ester in the magnetic layer forming composition is, for example, 0.1 to 10.0 parts by mass, and preferably 1.0 to 7.0 parts by mass per 100.0 parts by mass of the ferromagnetic powder. A content of a fatty acid amide in the magnetic layer forming composition is, for example, 0 to 3.0 parts by mass, preferably 0 to 2.0 parts by mass, and more preferably 0 to 1.0 part by mass per 100.0 parts by mass of the ferromagnetic powder.

In a case where the magnetic recording medium has a non-magnetic layer between the non-magnetic support and the magnetic layer, a content of a fatty acid in a non-magnetic layer forming composition is, for example, 0 to 10.0 parts by mass, preferably 1.0 to 10.0 parts by mass, and more preferably 1.0 to 7.0 parts by mass per 100.0 parts by mass of the non-magnetic powder. A content of a fatty acid ester in the non-magnetic layer forming composition is, for example, 0 to 10.0 parts by mass, and preferably 0.1 to 8.0 parts by mass per 100.0 parts by mass of the non-magnetic powder. A content of a fatty acid amide in the non-magnetic layer forming composition is, for example, 0 to 3.0 parts by mass, and preferably 0 to 1.0 part by mass per 100.0 parts by mass of the non-magnetic powder.

In the present invention and this specification, unless otherwise noted, a certain component may be used alone or in combination of two or more. A content in a case where two or more certain components are used refers to that for the total of two or more components.

As the non-magnetic powder used for forming the magnetic layer, non-magnetic powder that can function as a protrusion forming agent which forms protrusions suitably protruded from the magnetic layer surface (for example, non-magnetic colloid particles) is used. An average particle size of the protrusion forming agent is, for example, preferably in a range of 90 to 200 nm, and more preferably in a range of 100 to 150 nm. A content of the protrusion forming agent in the magnetic layer is preferably 0.1 to 10.0 parts by mass, more preferably 0.1 to 5.0 parts by mass, and still more preferably 1.0 to 5.0 parts by mass with respect to 100.0 parts by mass of the ferromagnetic powder. In a case where the content of the protrusion forming agent in the magnetic layer is reduced, the value of the difference ($S_{after}-S_{before}$) tends to be reduced in some cases.

As the non-magnetic powder used for forming the magnetic layer, well-known non-magnetic powder can also be used as an abrasive.

As an example of the additive which can be used in the magnetic layer including the abrasive, a dispersing agent disclosed in paragraphs 0012 to 0022 of JP2013-131285A can be used as a dispersing agent for improving dispersibility of the abrasive. For the dispersing agent for improving dispersibility of the ferromagnetic powder, a description disclosed in a paragraph 0035 of JP2017-016721A can be referred to. For the dispersing agent, descriptions disclosed in paragraphs 0061 and 0071 of JP2012-133837A can also be referred to. For the additive of the magnetic layer, descriptions disclosed in paragraphs 0035 to 0077 of JP2016-051493A can be referred to.

The dispersing agent may be included in a non-magnetic layer. For the dispersing agent which may be included in the non-magnetic layer, a description disclosed in a paragraph 0061 of JP2012-133837A can be referred to.

As various additives, a commercially available product can be suitably selected or manufactured by a well-known method according to the desired properties, and any amount thereof can be used.

The magnetic layer described above can be provided on a surface of the non-magnetic support directly or indirectly through the non-magnetic layer.

Non-Magnetic Layer

Next, the non-magnetic layer will be described. The magnetic recording medium may include a magnetic layer on a non-magnetic support directly, or may include a non-magnetic layer including non-magnetic powder between the non-magnetic support and the magnetic layer. The non-magnetic powder used in the non-magnetic layer may be powder of an inorganic substance or powder of an organic substance. In addition, carbon black and the like can also be used. Examples of the inorganic substance include metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably in a range of 50 to 90 mass % and more preferably in a range of 60 to 90 mass %.

The non-magnetic layer can include a binding agent and can also include an additive. In regards to details of the binding agent or the additive of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

In the present invention and this specification, the non-magnetic layer also includes a substantially non-magnetic layer including a small amount of ferromagnetic powder as impurities, for example, or intentionally, together with the non-magnetic powder. Here, the substantially non-magnetic layer is a layer having a residual magnetic flux density equal to or smaller than 10 mT, a layer having a coercivity equal to or smaller than 100 Oe, or a layer having a residual magnetic flux density equal to or smaller than 10 mT and a coercivity equal to or smaller than 100 Oe. It is preferable that the non-magnetic layer does not have a residual magnetic flux density and a coercivity.

Back Coating Layer

The magnetic recording medium may or may not include a back coating layer including non-magnetic powder on a surface side of the non-magnetic support opposite to the surface provided with the magnetic layer. Preferably, the back coating layer includes one or both of carbon black and inorganic powder. The back coating layer can include a binding agent and can also include an additive. In regards to details of the non-magnetic powder, the binding agent, and the additive of the back coating layer, the well-known technology regarding the back coating layer can be applied, and the well-known technology regarding a list of the magnetic layer and/or the non-magnetic layer can be applied. For example, for the back coating layer, descriptions disclosed in paragraphs 0018 to 0020 of JP2006-331625A and page 4, line 65 to page 5, line 38 of U.S. Pat. No. 7,029,774B can be referred to.

Various Thicknesses

A thickness of the non-magnetic support of the magnetic recording medium is, for example, 3.0 to 80.0 µm, preferably in a range of 3.0 to 50.0 µm, and more preferably in a range of 3.0 to 10.0 µm. In a case where the non-magnetic support is a laminated film of two or more layers, the thickness of the non-magnetic support refers to a total thickness of the laminated film.

A thickness of the magnetic layer can be optimized according to a saturation magnetization amount, a head gap length, and a band of a recording signal of the magnetic head used. The thickness thereof is, for example, 10 nm to 100 nm, and, from a viewpoint of high density recording, is preferably in a range of 20 to 90 nm and more preferably in a range of 30 to 70 nm. The magnetic layer may be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 50 nm or more, preferably 70 nm or more, and more preferably 100 nm or more. On the other hand, the thickness of the non-magnetic layer is preferably 800 nm or less, and more preferably 500 nm or less.

A thickness of the back coating layer is preferably 0.9 μm or less, and more preferably in a range of 0.1 to 0.7 μm.

Thicknesses of each layer of the magnetic recording medium and the non-magnetic support can be obtained by a well-known film thickness measurement method. As an example, a cross section of the magnetic recording medium in a thickness direction is exposed by well-known means such as an ion beam or a microtome, and then the exposed cross section observation is performed using a scanning electron microscope, for example. In the cross section observation, various thicknesses can be obtained as a thickness obtained at any one portion of the cross section, or an arithmetic average of thicknesses obtained at a plurality of portions of two or more portions, for example, two portions which are randomly extracted. In addition, the thickness of each layer may be obtained as a designed thickness calculated according to manufacturing conditions.

Manufacturing Method

Preparation of Each Layer Forming Composition

A composition for forming the magnetic layer, the non-magnetic layer, and the back coating layer usually contains a solvent together with the various components described above. As a solvent, various organic solvents generally used for manufacturing a coating type magnetic recording medium can be used. The amount of the solvent in each layer forming composition is not particularly limited, and can be the same as that of each layer forming composition of a normal coating type magnetic recording medium. A process of preparing a composition for forming each layer can generally include at least a kneading process, a dispersing process, and a mixing process provided before and after these processes as necessary. Each process may be divided into two or more stages. All the raw materials used in the present invention may be added at an initial stage or in a middle stage of each process. In addition, each raw material may be separately added in two or more processes.

In order to prepare each layer forming composition, the well-known technology can be used. In the kneading process, preferably, a kneader having a strong kneading force such as an open kneader, a continuous kneader, a pressure kneader, or an extruder is used. Details of the kneading treatment are disclosed in JP1989-106338A (JP-H01-106338A) and JP1989-079274A (JP-H01-079274A). Moreover, in order to disperse each layer forming composition, one or more kinds of dispersed beads selected from the group consisting of glass beads and other dispersed beads can be used as a dispersion medium. As such dispersed beads, zirconia beads, titania beads, and steel beads which are dispersed beads having a high specific gravity are suitable. These dispersed beads can be used by optimizing the particle diameter (bead diameter) and the filling rate. As a dispersing device, a well-known dispersing device can be used. Each layer forming composition may be filtered by a well-known method before being subjected to a coating process. The filtering can be performed by using a filter, for example. As the filter used in the filtering, a filter having a pore diameter of 0.01 to 3 μm (for example, filter made of glass fiber or filter made of polypropylene) can be used, for example.

Coating Process

The magnetic layer can be formed, for example, by directly applying the magnetic layer forming composition onto the non-magnetic support or performing multilayer coating of the magnetic layer forming composition with the non-magnetic layer forming composition in order or at the same time. The back coating layer can be formed by applying the back coating layer forming composition onto the side of the non-magnetic support opposite to the side provided with the magnetic layer (or on which the magnetic layer is to be provided). For details of coating for forming each layer, a description disclosed a paragraph 0051 of JP2010-024113A can be referred to.

Other Processes

After the coating process, various treatments such as a drying treatment, an orientation treatment of the magnetic layer, and a surface smoothing treatment (calendering treatment) can be performed. For the various processes, descriptions disclosed in paragraphs 0052 to 0057 of JP2010-024113A can be referred to. For example, a vertical orientation treatment can be performed by a well-known method such as a method using a polar opposing magnet. In an orientation zone, a drying speed of a coating layer can be controlled depending on a temperature and a flow rate of dry air and/or a transportation speed in the orientation zone. In addition, the coating layer may be preliminarily dried before the transportation to the orientation zone.

It is preferable to perform a heat treatment on the coating layer formed by applying the magnetic layer forming composition at any stage after the coating process of the magnetic layer forming composition. As an example, the heat treatment can be performed before and/or after the calendering treatment. The heat treatment can be performed, for example, by placing the support on which the coating layer of the magnetic layer forming composition is formed under a heating atmosphere. The heating atmosphere can be an atmosphere having an atmosphere temperature of 65° C. to 90° C., and preferably an atmosphere having an atmosphere temperature of 65° C. to 75° C. This atmosphere can be, for example, an air atmosphere. The heat treatment under the heating atmosphere can be performed, for example, for 20 to 50 hours. In an aspect, the heat treatment causes the curing reaction of the curable functional group of the curing agent to proceed.

Aspect of Manufacturing Method

An aspect of a method of manufacturing the magnetic recording medium includes wiping the magnetic layer surface with a wiping material infiltrated with methyl ethyl ketone, preferably after the heat treatment (hereinafter, also referred to as a "methyl-ethyl-ketone wiping treatment"). It is considered that the presence of the component that can be removed by a methyl-ethyl-ketone wiping treatment on the magnetic layer surface, as described above, promotes adhesion of the moisture to the magnetic layer surface in a case where a temperature change from a low temperature to a high temperature occurs under a high humidity. The methyl-ethyl-ketone wiping treatment can be performed using the wiping material infiltrated with methyl ethyl ketone instead of a wiping material used in a dry wiping treatment, in accordance with the dry wiping treatment generally performed in the manufacturing process of the magnetic recording medium. For example, for a tape-shaped magnetic recording medium (magnetic tape), after slitting or before slitting the magnetic tape into a width that can be accommodated in a magnetic tape cartridge, the magnetic tape is run between a feeding roller and a winding roller, and the wiping material (for example, clothes (for example, non-woven fabrics) or papers (for example, tissue papers)) infiltrated with methyl ethyl ketone is pressed against the magnetic layer surface of the running magnetic tape.

Thereby, the methyl-ethyl-ketone wiping treatment on the magnetic layer surface can be performed. A running speed and a tension (hereinafter, simply referred to as a "tension".) applied in the longitudinal direction of the magnetic layer surface of the magnetic tape in the above-mentioned running can be the same as the treatment condition generally used by the dry wiping treatment generally performed in the manufacturing process of the magnetic recording medium. For example, the running speed of the magnetic tape in the methyl-ethyl-ketone wiping treatment can be about 60 to 600 m/min, and the tension can be about 0.196 to 3.920 N (Newton). In addition, the methyl-ethyl-ketone wiping treatment can be performed at least once. It is preferable to set the treatment conditions and the number of treatments of the methyl-ethyl-ketone wiping treatment so that the spacing difference ($S_{after}-S_{before}$) before and after methyl-ethyl-ketone cleaning becomes more than 0 nm and 15.0 nm or less.

Additionally, before and/or after the methyl-ethyl-ketone wiping treatment, a polishing treatment and/or the dry wiping treatment (hereinafter, these are referred to as a "dry surface treatment".) which are generally performed in the manufacturing process of the coating type magnetic recording medium can be performed on the magnetic layer surface one or more times. According to the dry surface treatment, for example, it is possible to remove foreign matters, such as chips generated by the slitting, generated during the manufacturing process and adhering to the magnetic layer surface.

The tape-shaped magnetic recording medium (magnetic tape) has been hitherto described as an example. Various treatments can also be performed on a disk-shaped magnetic recording medium (magnetic disk) with reference to the above description.

The magnetic recording medium according to an aspect of the present invention described above may be a magnetic recording medium that includes an aromatic polyamide support and has a small deterioration of electromagnetic conversion characteristics even though being stored under a high temperature and high humidity environment after a temperature change from a low temperature to a high temperature under a high humidity. A temperature change from a low temperature to a high temperature under a high humidity may be, for example, a temperature change of about 15° C. to 50° C. from more than 0° C. to 15° C. to 30° C. to 50° C. under an environment of a relative humidity of about 70% to 100%. A storage under a high temperature and high humidity environment may be, for example, a storage under an environment of a temperature of 30° C. to 50° C. and a relative humidity of 70% to 100%.

The magnetic recording medium may be, for example, a tape-shaped magnetic recording medium (magnetic tape). The magnetic tape is generally distributed while being accommodated in the magnetic tape cartridge and used. The magnetic tape cartridge is mounted on a magnetic recording and reproducing apparatus, and the magnetic tape is run in the magnetic recording and reproducing apparatus so that a surface of the magnetic tape (magnetic layer surface) and the magnetic head come into contact with each other to be slid on each other. Thereby, data can be recorded and reproduced on the magnetic tape. However, the magnetic recording medium according to an aspect of the present invention is not limited to the magnetic tape. The magnetic recording medium according to one embodiment of the present invention is suitable as various magnetic recording media (magnetic tape, disk-shaped magnetic recording medium (magnetic disk), and the like) used in a sliding type magnetic recording and reproducing apparatus. The sliding type magnetic recording and reproducing apparatus is an apparatus in which the magnetic layer surface and the head come into contact with each other to be slid on each other, in a case of performing the recording of data on the magnetic recording medium and/or reproducing of the recorded data.

It is possible to form a servo pattern in the magnetic recording medium manufactured as described above by a well-known method in order to enable tracking control of the magnetic head in the magnetic recording and reproducing apparatus, control of a running speed of the magnetic recording medium, and the like. The "formation of servo pattern" can also be referred to as "recording of servo signal". The magnetic recording medium may be a tape-shaped magnetic recording medium (magnetic tape) or may be a disk-shaped magnetic recording medium (magnetic disk). Hereinafter, the formation of the servo pattern will be described using a magnetic tape as an example.

The servo pattern is usually formed along a longitudinal direction of the magnetic tape. Examples of control (servo control) types using a servo signal include a timing-based servo (TBS), an amplitude servo, and a frequency servo.

As shown in a european computer manufacturers association (ECMA)-319, a magnetic tape (generally called "LTO tape") conforming to a linear-tape-open (LTO) standard employs a timing-based servo type. In this timing-based servo type, the servo pattern is formed by continuously disposing a plurality of pairs of non-parallel magnetic stripes (also referred to as "servo stripes") in a longitudinal direction of the magnetic tape. As described above, the reason why the servo pattern is formed of a pair of non-parallel magnetic stripes is to indicate, to a servo signal reading element passing over the servo pattern, a passing position thereof. Specifically, the pair of magnetic stripes is formed so that an interval thereof continuously changes along a width direction of the magnetic tape, and the servo signal reading element reads the interval to thereby sense a relative position between the servo pattern and the servo signal reading element. Information on this relative position enables tracking on a data track. Therefore, a plurality of servo tracks are usually set on the servo pattern along a width direction of the magnetic tape.

A servo band is formed of servo signals continuous in a longitudinal direction of the magnetic tape. A plurality of servo bands are usually provided on the magnetic tape. For example, in an LTO tape, the number is five. A region interposed between two adjacent servo bands is referred to as a data band. The data band is formed of a plurality of data tracks, and each data track corresponds to each servo track.

Further, in an aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in a longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

Incidentally, as a method for uniquely specifying the servo band, there is a method using a staggered method as shown in ECMA-319. In this staggered method, a group of pairs of non-parallel magnetic stripes (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading element elements.

As shown in ECMA-319, information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Here, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for servo pattern forming head is called a servo write head. The servo write head has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 μm or less, 1 to 10 μm, 10 μm or more, and the like.

Before the servo pattern is formed on the magnetic tape, the magnetic tape is usually subjected to demagnetization (erasing) processing. This erasing processing can be performed by applying a uniform magnetic field to the magnetic tape using a direct current magnet or an alternating current magnet. The erasing processing includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a magnetic field in one direction to the magnetic tape. As the DC erasing, there are two methods. A first method is horizontal DC erasing of applying a magnetic field in one direction along a longitudinal direction of the magnetic tape. A second method is vertical DC erasing of applying a magnetic field in one direction along a thickness direction of the magnetic tape. The erasing processing may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-053940A, in a case where a magnetic pattern is transferred to, using the gap, a magnetic tape that has been subjected to vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

Magnetic Recording and Reproducing Apparatus

Another aspect of the present invention relates to a magnetic recording and reproducing apparatus comprising: the magnetic recording medium described above; and a magnetic head.

In the present invention and this specification, the "magnetic recording and reproducing apparatus" means an apparatus capable of performing at least one of the recording of data on the magnetic recording medium or the reproducing of data recorded on the magnetic recording medium. Such an apparatus is generally called a drive. The magnetic recording and reproducing apparatus can be a sliding type magnetic recording and reproducing apparatus. The magnetic head included in the magnetic recording and reproducing apparatus can be a recording head capable of performing the recording of data on the magnetic recording medium, or can be a reproducing head capable of performing the reproducing of data recorded on the magnetic recording medium. In addition, in an aspect, the magnetic recording and reproducing apparatus can include both of a recording head and a reproducing head as separate magnetic heads. In another aspect, the magnetic head included in the magnetic recording and reproducing apparatus may have a configuration in which both of a recording element and a reproducing element are provided in one magnetic head. As the reproducing head, a magnetic head (MR head) including a magnetoresistive (MR) element capable of sensitively reading data recorded on the magnetic recording medium as a reproducing element is preferable. Various well-known MR heads can be used as the MR head. In addition, the magnetic head which performs the recording of data and/or the reproducing of data may include a servo pattern reading element. Alternatively, as a head other than the magnetic head which performs the recording of data and/or the reproducing of data, a magnetic head (servo head) comprising a servo pattern reading element may be included in the magnetic recording and reproducing apparatus.

In the magnetic recording and reproducing apparatus, recording of data on the magnetic recording medium and reproducing of data recorded on the magnetic recording medium can be performed as the magnetic layer surface of the magnetic recording medium and the magnetic head come into contact with each other to be slid on each other. The magnetic recording and reproducing apparatus has only to include the magnetic recording medium according to an aspect of the present invention, and the well-known technology can be applied to the others.

EXAMPLES

Hereinafter, the present invention will be described with reference to examples. Here, the present invention is not limited to aspects shown in the examples. "Parts" and "%" in the following description mean "parts by mass" and "mass %", unless otherwise noted. In addition, processes and evaluations described below were performed in an environment of an atmosphere temperature of 23° C.±1° C., unless otherwise noted.

Example 1

A list of each layer forming composition is shown below.
List of Magnetic Layer Forming Composition
Magnetic Liquid
Ferromagnetic powder (see Table 1): 100.0 parts
Oleic acid: 2.0 parts
Vinyl chloride copolymer (MR-104 manufactured by Kaneka Corporation): 10.0 parts
 (weight-average molecular weight: 55000, active hydrogen-containing group (hydroxy group): 0.33 meq/g, $OSO_3K$ group (potassium salt of sulfuric acid group): 0.09 meq/g)
$SO_3Na$ group-containing polyurethane resin: 4.0 parts
 (weight-average molecular weight: 70,000, active hydrogen-containing group (hydroxy group): 4 to 6 mgKOH/g, $SO_3Na$ group (sodium salt of sulfonic acid group): 0.07 meq/g)
Polyalkyleneimine polymer (synthetic product obtained by the method disclosed in paragraphs 0115 to 0123 of JP2016-051493A): 6.0 parts
Methyl ethyl ketone: 150.0 parts
Cyclohexanone: 150.0 parts
Abrasive Liquid
α-Alumina (brunauer-emmett-teller (BET) specific surface area: 19 $m^2/g$): 6.0 parts
$SO_3Na$ group-containing polyurethane resin: 0.6 parts
 (weight-average molecular weight: 70,000, $So_3Na$ group: 0.1 meq/g)
2,3-Dihydroxynaphtalene: 0.6 parts
Cyclohexanone: 23.0 parts
Protrusion Forming Agent Liquid
Colloidal silica (average particle size: 120 nm): see Table 1
Methyl ethyl ketone: 8.0 parts
Other Components
Stearic acid: 3.0 parts
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Tosoh Corporation): 3 parts
List of Non-Magnetic Layer Forming Composition
Non-Magnetic Inorganic Powder
α-Iron oxide (average particle size: 10 nm, BET specific surface area: 75 $m^2/g$): 100.0 parts
Carbon black (average particle size: 20 nm): 25.0 parts
$SO_3Na$ group-containing polyurethane resin (weight-average molecular weight: 70000, S $O3Na$ group: 0.2 meq/g): 18.0 parts
Stearic acid: 1.0 part
Cyclohexanone: 300.0 parts
Methyl ethyl ketone: 300.0 parts
List of Back Coating Layer Forming Composition
Non-Magnetic Inorganic Powder
α-Iron oxide (average particle size: 0.15 μm, BET specific surface area: 52 $m^2/g$): 80.0 parts
Carbon black (average particle size: 20 nm): 20.0 parts
Vinyl chloride copolymer: 13.0 parts
Sulfonic acid group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts
Preparation of Magnetic Layer Forming Composition A magnetic layer forming composition was prepared by the following method.

A magnetic liquid was prepared by dispersing (beads-dispersing) various components of the magnetic liquid using a batch type vertical sand mill for 24 hours. As dispersed beads, zirconia beads having a bead diameter of 0.5 mm were used.

Various components of the above abrasive liquid were mixed and then the mixture was put in a horizontal beads mill dispersing device together with zirconia beads having a bead diameter of 0.3 mm, and a bead volume/(an abrasive liquid volume+a bead volume) was adjusted to be 80%, and beads mill dispersion processing was performed for 120 minutes. The liquid after the processing was taken out and subjected to ultrasonic dispersion filtration processing using a flow type ultrasonic dispersion filtration device. Thereby, an abrasive liquid was prepared.

The prepared magnetic liquid and abrasive liquid, the protrusion forming agent liquid and other components were introduced into a dissolver stirrer and stirred for 30 minutes at a circumferential speed of 10 m/sec, and then subjected to processes of 3 passes at a flow rate of 7.5 kg/min by a flow type ultrasonic dispersing device. Thereafter, a magnetic layer forming composition was prepared by filtration through a filter having a pore diameter of 1 μm.

Preparation of Non-Magnetic Layer Forming Composition

Various components of the non-magnetic layer forming composition were dispersed using zirconia beads having a bead diameter of 0.1 mm by a batch type vertical sand mill for 24 hours, and then filtered using a filter having an average pore diameter of 0.5 μm. Thereby, a non-magnetic layer forming composition was prepared.

Preparation of Back Coating Layer Forming Composition

Components excluding a lubricant (stearic acid and butyl stearate), polyisocyanate, and 200.0 parts of cyclohexanone among various components of the back coating layer forming composition were kneaded and diluted by an open kneader, and then subjected to dispersion processes of 12 passes, with a horizontal beads mill dispersing device using zirconia beads having a bead diameter of 1 mm, by setting a retention time per pass to 2 minutes at a bead filling rate of 80 vol % and a rotor tip circumferential speed of 10 m/sec. Thereafter, the remaining components were added thereto and stirred by a dissolver, and the obtained dispersion liquid was filtered using a filter having an average pore diameter of 1 μm. Thereby, a back coating layer forming composition was prepared.

Manufacturing of Magnetic Tape

The non-magnetic layer forming composition prepared in the above section was applied onto a surface of an aromatic polyamide support having a thickness of 8.0 μm shown in Table 1 so that the thickness after the drying becomes 400 nm and was dried to form a non-magnetic layer. Then, the magnetic layer forming composition prepared in the above section was applied onto a surface of a non-magnetic layer so that the thickness after the drying becomes 70 nm to form a coating layer. While the coating layer of the magnetic layer forming composition is in a wet (not dried) state, a vertical orientation treatment for applying a magnetic field having a magnetic field intensity of 0.3 T in a vertical direction with respect to a surface of a coating layer was performed, and then the coating layer was dried. Thereafter, the back coating layer forming composition prepared in the above section was applied onto an opposite surface of the support so that the thickness after the drying becomes 0.4 μm, and then the surface was dried. Thus, a magnetic tape original roll was manufactured.

The manufactured magnetic tape original roll was subjected to a calendering treatment (surface smoothing treatment) by a calender formed of only metal rolls at a speed of 100 m/min, a linear pressure of 294 kN/m, and a surface temperature of a calender roll of 100° C. Then, a heat treatment was performed in an environment of an atmosphere temperature shown in Table 1 for the time shown in Table 1. After the heat treatment, the magnetic tape original roll was slit by a cutter to obtain a magnetic tape having ½ inches width. While running this magnetic tape between a feeding roller and a winding roller (running speed of 120 m/min, tension: see Table 1), a blade polishing, a dry wiping treatment, and a methyl-ethyl-ketone wiping treatment of the magnetic layer surface were performed in this order. Specifically, a sapphire blade, a dry wiping material (Toraysee manufactured by TORAY INDUSTRIES, INC. (registered trademark)), and a wiping material (Toraysee manufactured by TORAY INDUSTRIES, INC. (registered trademark)) infiltrated with methyl ethyl ketone were disposed between the two rollers. The sapphire blade was pressed against the magnetic layer surface of the magnetic tape running between the two rollers to perform the blade polishing, and then the dry wiping treatment on the magnetic layer surface was performed by the dry wiping material, and then the methyl-ethyl-ketone wiping treatment on the magnetic layer surface was performed by the wiping material infiltrated with methyl ethyl ketone. Thereby, the blade polishing, the dry wiping treatment, and the methyl-ethyl-ketone wiping treatment were each performed once on the magnetic layer surface.

Thus, a magnetic tape of Example 1 was obtained.

Examples 2 to 11 and Comparative Examples 1 to 7

A magnetic tape was manufactured in the same manner as in Example 1 except that various conditions were changed as shown in Table 1.

Regarding the surface treatment of the magnetic layer surface after the slitting, in Examples 2 to 11 and Comparative Examples 1 to 6, the following surface treatments were respectively performed.

In Examples 2 to 4, 6 to 11, and Comparative Example 4, the blade polishing, the dry wiping treatment, and the methyl-ethyl-ketone wiping treatment were performed in the same manner as in Example 1.

In Example 5 and Comparative Examples 5 and 6, the blade polishing, the dry wiping treatment, and the methyl-ethyl-ketone wiping treatment were performed in the same manner as in Example 1 except that the tension was changed.

In Comparative Examples 1, 3, and 7, the blade polishing and the dry wiping treatment were performed in the same manner as in Example 1, and the methyl-ethyl-ketone wiping treatment was not performed.

In Comparative Example 2, the blade polishing and the dry wiping treatment were repeated three times in the same manner as in Example 1, and the methyl-ethyl-ketone wiping treatment was not performed.

In Table 1, "BaFe" is hexagonal barium ferrite powder having an average particle size (average plate diameter) of 21 nm.

In Table 1, "SrFe1" is hexagonal strontium ferrite powder manufactured by the following method.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed using a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a water-cooled twin roller to manufacture an amorphous body.

280 g of the manufactured amorphous body was charged into an electric furnace, was heated to 635° C. (crystallization temperature) at a heating rate of 3.5° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 ml of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be cleaned by repeatedly performing decantation and was dried in a heating furnace at an internal temperature of the furnace of 110° C. for 6 hours to obtain hexagonal strontium ferrite powder.

An average particle size of the hexagonal strontium ferrite powder obtained above was 18 nm, an activation volume was 902 $nm^3$, an anisotropy constant Ku was $2.2 \times 10^5$ $J/m^3$, and a mass magnetization σs was 49 $A \cdot m^2/kg$.

12 mg of sample powder was taken from the hexagonal strontium ferrite powder obtained above, elemental analysis of the filtrated solution obtained by partially dissolving this sample powder under dissolution conditions illustrated above was performed by an ICP analyzer, and a surface layer portion content of a neodymium atom was obtained.

Separately, 12 mg of sample powder was taken from the hexagonal strontium ferrite powder obtained above, elemental analysis of the filtrated solution obtained by totally dissolving this sample powder under dissolution conditions illustrated above was performed by an ICP analyzer, and a bulk content of a neodymium atom was obtained.

A content (bulk content) of a neodymium atom with respect to 100 at % of an iron atom in the hexagonal strontium ferrite powder obtained above was 2.9 at %. A surface layer portion content of a neodymium atom was 8.0 at %. It was confirmed that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M-type). A crystal phase detected by X-ray diffraction analysis was a single phase of a magnetoplumbite type.

PANalytical X'Pert Pro diffractometer, PIXcel detector

Soller slit of incident beam and diffracted beam: 0.017 radians

Fixed angle of dispersion slit: ¼ degrees

Mask: 10 mm

Anti-scattering slit: ¼ degrees

Measurement mode: continuous

Measurement time per stage: 3 seconds

Measurement speed: 0.017 degrees per second

Measurement step: 0.05 degrees

In Table 1, "SrFe2" is hexagonal strontium ferrite powder manufactured by the following method.

1725 g of $SrCO_3$, 666 g of $H_3BO_3$, 1332 g of $Fe_2O_3$, 52 g of $Al(OH)_3$, 34 g of $CaCO_3$, and 141 g of $BaCO_3$ were weighed and mixed using a mixer to obtain a raw material mixture.

The obtained raw material mixture was melted in a platinum crucible at a melting temperature of 1380° C., and a hot water outlet provided at a bottom of the platinum crucible was heated while stirring a melt, and the melt was discharged in a rod shape at about 6 g/sec. Hot water was rolled and quenched by a water-cooled twin roller to manufacture an amorphous body.

280 g of the obtained amorphous body was charged into an electric furnace, was heated to 645° C. (crystallization temperature), and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 ml of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be cleaned by repeatedly performing decantation and was dried in a heating furnace at an internal temperature of the furnace of 110° C. for 6 hours to obtain hexagonal strontium ferrite powder.

An average particle size of the obtained hexagonal strontium ferrite powder was 19 nm, an activation volume was 1102 $nm^3$, an anisotropy constant Ku was $2.0 \times 10^5$ $J/m^3$, and a mass magnetization σs as was 50 $A \cdot m^2/kg$.

In Table 1, "ε-iron oxide" is ε-iron oxide powder manufactured by the following method.

8.3 g of iron (III) nonahydrate, 1.3 g of gallium (III) nitrate octahydrate, 190 mg of cobalt (II) nitrate hexahydrate, 150 mg of titanium (IV) sulfate, and 1.5 g of polyvinylpyrrolidone (PVP) were dissolved in 90 g of pure water, and while the dissolved product was stirred using a magnetic stirrer, 4.0 g of an aqueous ammonia solution having a concentration of 25% was added to the dissolved product under an atmosphere temperature of 25° C. in an air atmosphere, and the resultant was stirred for 2 hours while maintaining a temperature condition of the atmosphere temperature of 25° C. A citric acid solution obtained by dissolving 1 g of citric acid in 9 g of pure water was added to the obtained solution, and the mixture was stirred for 1 hour. The powder sedimented after stirring was collected by centrifugal separation, was cleaned with pure water, and was dried in a heating furnace at a furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was dropwise added with stirring. After stirring for 1 hour while maintaining the temperature at 50° C., 14 mL of tetraethoxysilane (TEOS) was dropwise added and was stirred for 24 hours. Powder sedimented by adding 50 g of ammonium sulfate to the obtained reaction solution was collected by centrifugal separation, was cleaned with pure water, and was dried in a heating furnace at a furnace temperature of 80° C. for 24 hours to obtain a ferromagnetic powder precursor.

The obtained ferromagnetic powder precursor was loaded into a heating furnace at a furnace temperature of 1000° C. in an air atmosphere and was heat-treated for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was cleaned with pure water to obtain a ferromagnetic powder.

The composition of the obtained ferromagnetic powder that was confirmed by high-frequency inductively coupled plasma-optical emission spectrometry (ICP-OES) has Ga, Co, and a Ti substitution type ε-iron oxide (ε-$Ga_{0.28}Co_{0.05}Ti_{0.05}Fe_{1.62}O_3$). In addition, X-ray diffraction analysis is performed under the same condition as that described above for SrFe1, and from a peak of an X-ray diffraction pattern, it was confirmed that the obtained ferromagnetic powder does not include α-phase and γ-phase crystal structures, and has a single-phase and ε-phase crystal structure (ε-iron oxide type crystal structure).

An average particle size of the obtained ε-iron oxide powder was 12 nm, an activation volume was 746 $nm^3$, an anisotropy constant Ku was $1.2 \times 10^5$ $J/m^3$, and a mass magnetization σs was 16 $A \cdot m^2/kg$.

The activation volume and the anisotropy constant Ku of each of the above hexagonal strontium ferrite powder and ε-iron oxide powder are values obtained by the method described above for each ferromagnetic powder using a vibrating sample magnetometer (manufactured by Toei Kogyo Co., Ltd.).

In addition, the mass magnetization as is a value measured at a magnetic field intensity of 15 kOe using a vibrating sample magnetometer (manufactured by Toei Kogyo Co., Ltd.).

In Table 1, "Support 1" described in the row of the type of the aromatic polyamide support is an aromatic polyamide film manufactured by the method disclosed in Example 7 of JP1997-176306A (JP-H09-176306A).

"Support 2" is an aromatic polyamide film manufactured by the method disclosed in Example 6 of JP1997-176306A (JP-H09-176306A).

"Support 3" is an aromatic polyamide film manufactured by the method disclosed in Example 3 of JP1997-176306A (JP-H09-176306A).

"Support 4" is an aromatic polyamide film manufactured by the method disclosed in Comparative Example 3 of JP1997-176306A (JP-H09-176306A).

A sample piece of a few grams was cut out from each aromatic polyamide support, and the moisture absorption thereof was obtained by the method described above. The result was a value shown in Table 1.

Evaluation Method (1) Spacing Difference ($S_{after}-S_{before}$) before and after Methyl-Ethyl-Ketone Cleaning Using a tape spacing analyzer (TSA; manufactured by Micro Physics), a spacing difference ($S_{after}-S_{before}$) before and after methyl-ethyl-ketone cleaning was obtained by the following method.

Two sample pieces having a length of 5 cm were cut from each of the magnetic tapes of the examples and the comparative examples, and one sample piece was not subjected to methyl-ethyl-ketone cleaning, and a spacing ($S_{before}$) was obtained by the following method. The other sample piece was subjected to methyl-ethyl-ketone cleaning by the method described above, and then a spacing ($S_{after}$) was obtained by the following method.

In a state where a glass plate (a glass plate manufactured by Thorlabs, Inc. (model number: WG10530)) provided in TSA was disposed on the magnetic layer surface of the magnetic tape (specifically, the above sample piece), using a urethane hemisphere provided in the TSA as a pressing member, the hemisphere was pressed against a surface of the back coating layer of the magnetic tape at a pressure of 0.5 atm. In this state, white light was emitted from a stroboscope provided in the TSA to a certain region (150,000 to 200,000 $\mu m^2$) on the magnetic layer surface of the magnetic tape through a glass plate, and the obtained reflected light was received by a charge-coupled device (CCD) through an interference filter (a filter that selectively transmits light having a wavelength of 633 nm), and thus an interference fringe image generated in an unevenness of this region was obtained.

This image was divided into 300,000 points to obtain a distance (spacing) from the magnetic tape side surface of the glass plate to the magnetic layer surface of the magnetic tape at each point, and this was used as a histogram, and thus a difference ($S_{after}-S_{before}$) was obtained by subtracting a mode value $S_{before}$ of the histogram obtained for the sample piece without methyl-ethyl-ketone cleaning from a mode value $S_{after}$ of the histogram obtained for the sample piece after methyl-ethyl-ketone cleaning.

(2) Spacing Difference ($S_{reference}-S_{before}$) before and after n-Hexane Cleaning (reference value)

One sample piece having a length of 5 cm was further cut from each of the magnetic tapes of the examples and the comparative examples and was cleaned in the same manner as the above except that n-hexane was used instead of methyl ethyl ketone, and then a spacing after n-hexane cleaning was obtained in the same manner as described above. As a reference value, a difference ($S_{reference}-S_{before}$) between a spacing $S_{reference}$ obtained here and a spacing $S_{before}$ obtained for the uncleaned sample piece obtained in the above (1) was obtained.

(3) Signal-to-Noise-Ratio (SNR) Decrease (i) Under an environment of an atmosphere temperature of 23° C. and a relative humidity of 50%, for each of the magnetic tapes of the examples and the comparative examples, a recording head (a metal-in-gap (MIG) head, a gap length of 0.15 µm, a track width of 1.0 µm, 1.8 T) and a reproducing head (a giant magnetoresistive (GMR) head, an element thickness of 15 nm, a shield spacing of 0.1 µm, a track width of 1.0 µm) were attached to a loop tester, and a signal having a linear recording density of 325 kfci was recorded. The unit kfci is a unit (cannot be converted to an SI unit system) of a linear recording density. After that, the reproducing output was measured, and an SNR was obtained as a ratio between the reproducing output and a noise. An SNR was obtained as a relative value when an SNR of Comparative Example 1 was 0 dB.

(ii) After evaluating the SNR in the above (i), each of the magnetic tapes of the examples and the comparative examples was stored for 3 hours in a thermo box of which the inside was maintained at a temperature of 10° C. and a relative humidity of 80%. Thereafter, the magnetic tape was taken out from the thermo box (outside air is at a temperature of 23° C. and a relative humidity of 50%), moved to a thermo room of which the inside was maintained at a temperature of 32° C. and a relative humidity of 80% within 1 minute and stored for 1 week, and then recording and reproducing were performed in the thermo room in the same manner as in the above (i). Thus, an SNR was obtained as a relative value when the SNR of Comparative Example 1 obtained in the above (i) was 0 dB. For each of the magnetic tapes of the examples and the comparative examples, a difference ("SNR obtained in (ii)"-"SNR obtained in the above (i)") between the SNR obtained here and the SNR obtained in (i) was calculated and used as an SNR decrease. In a case where the SNR decrease obtained here is within −1.0 dB, it can be evaluated that a decrease in an SNR after a storage under a high temperature and high humidity environment after a temperature change from a low temperature to a high temperature under a high humidity is suppressed.

The above results are shown in Table 1 (Table 1-1 and Table 1-2).

TABLE 1

| | | Example 1 | Example 2 | Example 3 | Example 4 | Example 5 | Example 6 |
|---|---|---|---|---|---|---|---|
| Ferromagnetic powder | | BaFe | BaFe | BaFe | BaFe | BaFe | BaFe |
| Colloidal silica content of protrusion forming agent liquid | | 2.0 parts by mass | 1.5 parts by mass | 1.0 part by mass | 2.0 parts by mass | 2.0 parts by mass | 2.0 parts by mass |
| Heat treatment | Temperature | 70° C. | 70° C. | 70° C. | 80° C. | 80° C. | 70° C. |
| | Time | 36 hours | 36 hours | 36 hours | 48 hours | 48 hours | 36 hours |
| Tension (N) | | 0.294 | 0.294 | 0.294 | 0.294 | 0.588 | 0.294 |
| Blade polishing and dry wiping treatment | | Once | Once | Once | Once | Once | Once |
| Methyl-ethyl-ketone wiping treatment | | Once | Once | Once | Once | Once | Once |
| (Reference value) Spacing difference ($S_{reference} - S_{before}$) before and after n-hexane cleaning (nm) | | 2.0 | 2.0 | 2.0 | 2.0 | 1.5 | 2.0 |

TABLE 1-continued

|  |  | | | | | | |
|---|---|---|---|---|---|---|---|
| Spacing difference ($S_{after} - S_{before}$) before and after methyl-ethyl-ketone cleaning (nm) | | 12.0 | 10.0 | 11.0 | 7.0 | 3.0 | 12.0 |
| Aromatic polyamide support | Type | Support 1 | Support 1 | Support 1 | Support 1 | Support 1 | Support 2 |
| | Moisture absorption | 1.4% | 1.4% | 1.4% | 1.4% | 1.4% | 1.9% |
| SNR decrease | | −0.7 dB | −0.5 dB | −0.8 dB | −0.3 dB | −0.2 dB | −0.8 dB |

| | | Example 7 | Example 8 | Example 9 | Example 10 | Example 11 |
|---|---|---|---|---|---|---|
| Ferromagnetic powder | | BaFe | BaFe | SrFe1 | SrFe2 | ε-iron oxide |
| Colloidal silica content of protrusion forming agent liquid | | 2.0 parts by mass | 2.5 parts by mass | 2.0 parts by mass | 2.0 parts by mass | 2.0 parts by mass |
| Heat treatment | Temperature | 70° C. | 70° C. | 70° C. | 70° C. | 70° C. |
| | Time | 36 hours | 36 hours | 36 hours | 36 hours | 36 hours |
| Tension (N) | | 0.294 | 0.294 | 0.294 | 0.294 | 0.294 |
| Blade polishing and dry wiping treatment | | Once | Once | Once | Once | Once |
| Methyl-ethyl-ketone wiping treatment | | Once | Once | Once | Once | Once |
| (Reference value) Spacing difference ($S_{reference} - S_{before}$) before and after n-hexane cleaning (nm) | | 2.0 | 2.0 | 2.0 | 2.0 | 2.0 |
| Spacing difference ($S_{after} - S_{before}$) before and after methyl-ethyl-ketone cleaning (nm) | | 12.0 | 15.0 | 12.0 | 12.0 | 12.0 |
| Aromatic polyamide support | Type | Support 3 | Support 1 | Support 1 | Support 1 | Support 1 |
| | Moisture absorption | 1.7% | 1.4% | 1.4% | 1.4% | 1.4% |
| SNR decrease | | −0.8 dB | −0.8 dB | −0.8 dB | −0.8 dB | −0.9 dB |

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Ferromagnetic powder | | BaFe | BaFe | BaFe | BaFe | BaFe | BaFe | BaFe |
| Colloidal silica content of protrusion forming agent liquid | | 2.0 parts by mass | 2.0 parts by mass | 2.0 parts by mass | 2.0 parts by mass | 2.0 parts by mass | 2.0 parts by mass | 2.0 parts by mass |
| Heat treatment | Temperature | 60° C. | 60° C. | 70° C. | 70° C. | 80° C. | 80° C. | 70° C. |
| | Time | 24 hours | 24 hours | 36 hours | 36 hours | 48 hours | 48 hours | 36 hours |
| Tension (N) | | 0.294 | 0.294 | 0.294 | 0.294 | 0.588 | 1.960 | 0.294 |
| Blade polishing and dry wiping treatment | | Once | Three times | Once | Once | Once | Once | Once |
| Methyl-ethyl-ketone wiping treatment | | Not performed | Not performed | Not performed | Once | Once | Once | Not performed |
| (Reference value) Spacing difference ($S_{reference} - S_{before}$) before and after n-hexane cleaning (nm) | | 2.0 | 2.0 | 2.0 | 2.0 | 1.5 | 0.0 | 2.0 |
| Spacing difference ($S_{after} - S_{before}$) before and after methyl-ethyl-ketone cleaning (nm) | | 20.0 | 19.0 | 18.0 | 12.0 | 3.0 | 0.0 | 18.0 |
| Aromatic polyamide support | Type | Support 4 | Support 4 | Support 4 | Support 4 | Support 4 | Support 1 | Support 1 |
| | Moisture absorption | 2.3% | 2.3% | 2.3% | 2.3% | 2.3% | 1.4% | 1.4% |
| SNR decrease | | −7.0 dB | −5.0 dB | −4.0 dB | −2.5 dB | −2.0 dB | −3.0 dB | −3.0 dB |

The magnetic tape of the examples is a magnetic tape having an aromatic polyamide support. From the evaluation results of the SNR decrease in Table 1, it can be confirmed that in the magnetic recording medium tape of the examples, a decrease in an SNR after a storage under a high temperature and high humidity environment after a temperature change from a low temperature to a high temperature under a high humidity is suppressed.

As shown in Table 1, there was no correlation between the value of the spacing difference ($S_{reference}-S_{before}$) before and after n-hexane cleaning and the value of the spacing difference ($S_{after}-S_{before}$) before and after methyl-ethyl-ketone cleaning.

An aspect of the present invention is useful in the technical field of various data storage magnetic recording media.

What is claimed is:

1. A magnetic recording medium comprising:
a non-magnetic support; and
a magnetic layer including ferromagnetic powder,
wherein a difference $S_{after}-S_{before}$ between a spacing $S_{after}$ measured on a surface of the magnetic layer by optical interferometry after methyl-ethyl-ketone cleaning and a spacing $S_{before}$ measured on the surface of the magnetic layer by optical interferometry before methyl-ethyl-ketone cleaning is more than 0 nm and 15.0 nm or less, and the non-magnetic support is an aromatic polyamide support having a moisture absorption of 2.2% or less.

2. The magnetic recording medium according to claim 1, wherein the difference $S_{after}-S_{before}$ is 3.0 nm or more and 15.0 nm or less.

3. The magnetic recording medium according to claim 1, wherein the moisture absorption of the aromatic polyamide support is 2.0% or less.

4. The magnetic recording medium according to claim 1, wherein the moisture absorption of the aromatic polyamide support is 1.0% or more and 2.0% or less.

5. The magnetic recording medium according to claim 1, further comprising:
a non-magnetic layer including non-magnetic powder between the non-magnetic support and the magnetic layer.

6. The magnetic recording medium according to claim 1, further comprising:
a back coating layer including non-magnetic powder on a surface side of the non-magnetic support opposite to a surface side provided with the magnetic layer.

7. The magnetic recording medium according to claim 1, wherein the magnetic recording medium is a magnetic tape.

8. A magnetic recording and reproducing apparatus comprising:
the magnetic recording medium according to claim 1; and
a magnetic head.

9. The magnetic recording and reproducing apparatus according to claim 8, wherein the difference $S_{after}-S_{before}$ is 3.0 nm or more and 15.0 nm or less.

10. The magnetic recording and reproducing apparatus according to claim 8, wherein the moisture absorption of the aromatic polyamide support is 2.0% or less.

11. The magnetic recording and reproducing apparatus according to claim 8, wherein the moisture absorption of the aromatic polyamide support is 1.0% or more and 2.0% or less.

12. The magnetic recording and reproducing apparatus according to claim 8, wherein the magnetic recording medium further comprises a non-magnetic layer including non-magnetic powder between the non-magnetic support and the magnetic layer.

13. The magnetic recording and reproducing apparatus according to claim 8, wherein the magnetic recording medium further comprises a back coating layer including non-magnetic powder on a surface side of the non-magnetic support opposite to a surface side provided with the magnetic layer.

14. The magnetic recording and reproducing apparatus according to claim 8, wherein the magnetic recording medium is a magnetic tape.

* * * * *